US008019872B2

(12) United States Patent
Lora et al.

(10) Patent No.: US 8,019,872 B2
(45) Date of Patent: Sep. 13, 2011

(54) SYSTEMS, METHODS AND COMPUTER PROGRAM PRODUCTS FOR PERFORMING REMOTE DATA STORAGE FOR CLIENT DEVICES

(75) Inventors: Brian M. Lora, Raleigh, NC (US); Christopher L. Pilione, Raleigh, NC (US); David W. Rutherford, Raleigh, NC (US); Michael M. DeGuzman, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 11/772,944

(22) Filed: Jul. 3, 2007

(65) Prior Publication Data

US 2008/0016148 A1    Jan. 17, 2008

Related U.S. Application Data

(60) Provisional application No. 60/830,394, filed on Jul. 12, 2006.

(51) Int. Cl.
*G06F 15/173* (2006.01)

(52) U.S. Cl. ........................................ 709/226

(58) Field of Classification Search .................... None
See application file for complete search history.

(56) References Cited

U.S. PATENT DOCUMENTS

| 5,987,506 | A  | * | 11/1999 | Carter et al.    | 709/213 |
|-----------|----|---|---------|------------------|---------|
| 6,314,503 | B1 | * | 11/2001 | D'Errico et al.  | 711/165 |
| 6,487,390 | B1 | * | 11/2002 | Virine et al.    | 455/3.01 |
| 6,816,905 | B1 |   | 11/2004 | Sheets et al.    |         |
| 6,880,002 | B2 |   | 4/2005  | Hirschfeld et al.|         |
| 6,889,309 | B1 | * | 5/2005  | Oliveira et al.  | 711/203 |
| 6,968,463 | B2 | * | 11/2005 | Pherson et al.   | 726/3   |
| 7,181,578 | B1 | * | 2/2007  | Guha et al.      | 711/154 |
| 7,325,051 | B2 | * | 1/2008  | Das et al.       | 709/223 |
| 7,383,288 | B2 |   | 6/2008  | Miloushev et al. |         |
| 7,530,065 | B1 | * | 5/2009  | Ciudad et al.    | 717/174 |
| 7,574,443 | B2 | * | 8/2009  | Bahar et al.     | 711/100 |
| 2004/0024861 | A1 | * | 2/2004 | Coughlin       | 709/224 |
| 2006/0004830 | A1 |   | 1/2006 | Lora et al.    |         |
| 2009/0216815 | A1 | * | 8/2009 | Braginsky et al.| 709/223 |

OTHER PUBLICATIONS

Beck, Micah et al. "An End-to-End Approach to Globally Scalable Network Storage." Proceedings of the 2002 Conference on Applications, Technologies, Architectures, and Protocols for Computer Communications. ACM Press. Aug. 2002. 339-46.*

Aizikowitz, Nava et al. "Component-Based Performance Modeling of a Storage Area Network." Proceedings of the 2005 Winter Simulation Conference. Dec. 2005. Winter Simulation Conference. 2417-26.*

OTHER PUBLICATIONS

Anderson, Darrell et al. "Interposed Request Routing for Scalable Network Storage." ACM Transactions on Computer Systems. vol. 20, No. 1. Feb. 2002. 25-48. ACM Press.*

Form PCT/ISA/220—Notification of Transmittal of the International Search Report and the Written Opinion of the International Searching Authority, or the Declaration. Sep. 16, 2008.

Form PCT/ISA/210—International Search Report. Sep. 16, 2008.

Form PCT/ISA/237—Written Opinion of the International Searching Authority, Sep. 16, 2008.

* cited by examiner

*Primary Examiner* — Jeffrey R Swearingen

(74) *Attorney, Agent, or Firm* — William E. Schiesser; Roberts Mlotkowski Safran & Cole, P.C.

(57) ABSTRACT

Remote data storage is performed for client devices that are associated with an enterprise, by performing the following automatically at a given client device in response to authorization from the given client device: obtaining metadata about the given client device; uploading the metadata to a remote data storage system and initiating an initial remote data storage to the remote data storage system using the metadata that was obtained. At the remote data storage system, a load balancing program may be executed to programmatically assign a given client device to a subset of remote data storage devices in response to obtaining the metadata about the given client device.

24 Claims, 26 Drawing Sheets

Installer Configuration 2

| Instructions | Start | Configure Customer Defaults (Optional Step) | Installer Config 1 | Installer Config 2 | Confirm Selections |

Please select the installers you would like created for the customer.

Windows-IDC1-PC

Create This Installer ☐

| Schedule Options | Schedule 1 ▼ | Weekly on Monday |
| Retention Options | Retention 1 ▼ | 8-4-4 |
| Target List | Targets 1 ▼ | C:\ |
| Exclusion List | Exclusions 1 ▼ | *mp3, *avi, *mpg, *mpeg, *mov, *wav, *midi, *mp2 |

Windows-IDC1-Server

Create This Installer ☐

| Schedule Options | Schedule 2 ▼ | Weekly on Monday |
| Retention Options | Retention 2 ▼ | 8-4-7 |
| Target List | Targets 2 ▼ | C:\My Documents\, C:\Windows\, C:\Documents and Settings\, C:\Oracle\ |
| Exclusion List | Exclusions 2 ▼ | -none- |

[ Create Selected Installers ]

Via Remote}} Order Form

Existing Devices

Type the amount of new devices you wish to add in the "New Devices" column for each tier.

Via Remote ® Online Backup

| Tier Name | Size | Price | Existing Devices | New Devices |
|---|---|---|---|---|
| Tier 1 | 1 GB | $5.00 | 0 | 2 |
| Tier 2 | 2 GB | $7.50 | 0 | 1 |
| Tier 3 | 4 GB | $12.50 | 0 | 0 |

In the event the Customer exceeds the storage amount on the plan to which the Customer subscribes, the Customer will be obligated to pay an overage charge of $X.XX per month for each gigabyte of storage space used in excess of the subscribed storage limit. This ○ I accept the terms of the pricing terms and conditions
◉ I do accept the terms of the pricing terms and conditions

[add to cart]

FIG. 7F

Dear <customer name>,

Congratulations, your initial backup for hostname: XXXXX is now complete. Backups will continue to run on a scheduled basis according to the schedule that you selected at installation time. To restore files from your backups, please click the Restore Portal link below and login using the credentials provided to you in the previous service email.

Thank you for choosing ViaRemote to automatically protect your most important asset, your information!

Sincerely,
Arsenal Digital Solutions

FIG. 7R

SYSTEMS, METHODS AND COMPUTER PROGRAM PRODUCTS FOR PERFORMING REMOTE DATA STORAGE FOR CLIENT DEVICES

CROSS-REFERENCE TO RELATED APPLICATION

This application claims the benefit of Provisional Application Ser. No. 60/830,394, filed Jul. 12, 2006, entitled Systems, Methods and Computer Program Products for Rapidly and Accurately Subscribing Customers to Data Storage Management Services, the disclosure of which is hereby incorporated herein by reference in its entirety as if set forth fully herein.

FIELD OF THE INVENTION

The present invention relates generally to data storage and, more particularly, to management of data storage systems.

BACKGROUND OF THE INVENTION

The evolution of information technology into the central nervous system of the modern enterprise has dramatically changed the amount of digital information generated and stored by today's business ventures. Personal productivity applications such as spreadsheets, word processors, presentation software, and personal database programs have driven personal computers (PCs) to include gigabytes of storage. E-mail has become a core business communication tool and the worldwide e-mailbox count is presently estimated to exceed one billion. Both e-mail volume and e-mail attachment size and volume continue to increase dramatically. At the same time department and workgroup collaborative applications combined with Web and customer-facing have resulted in the generation of terabytes of data. The full impact of multimedia digitization of books, audio, and video may yet be realized.

As a result, the mission critical nature of an enterprise's digital information (data) has increased. Data is now often viewed as the life blood of the enterprise since any disruption in electronic data flow can destroy an enterprise's ability to function. Current industry estimates suggest an enterprise that experiences a disruption in data access lasting more than 10 days may never fully recover financially, and that 50% of those may be out of business within 5 years. Therefore, data storage is often now viewed as a critical business function and maintaining its availability, integrity, and security is a matter of survival for enterprises today.

This new position of electronic data as a core mission critical asset is creating new challenges in information and data storage management. New innovations in storage management have enabled the replacement of traditional direct-attached storage systems with centralized storage networks. In a centralized storage network environment, documents and other data are stored in a central file system owned, controlled, or directly managed by the enterprise, or by a contracted outsourcing organization. A storage management system is accessed via a private network such as a local area network (LAN) or a restricted subset of public network technology such as an Intranet or a virtual private network (VPN). Typical enterprise storage management systems provide techniques to index documents by document categories and keywords, plain-language names, document numbers and/or entered attributes. Index based searching capabilities are typically provided, also.

Centralized storage networks can allow storage devices to be decoupled from specific hardware and managed as a centralized resource pool. Virtually any server can have access to any and all of the storage capacity, allowing available storage to be allocated to the point of need. Both scalability and flexibility may be increased, and growing needs for storage can be met by adding more capacity to a storage pool instead of individual point servers.

However, while data storage networks may enable improved efficiencies and scalabilities of storage hardware, the complexities of managing storage networks may increase dramatically. Problems that arise can be extremely complex and difficult to solve, and typically require an enterprise to have access to highly skilled and specialized technicians. As a result, data storage system administration can represent a substantial portion of an enterprise's information technology (IT) budget. Moreover, data storage system problems and disruptions may severely impact business continuity.

As a result, many enterprises are viewing data storage management skills as a required core competency. However, they are finding it difficult and expensive to train, maintain, and retain in-house expertise. The infrequency of problems within any one firm may make it difficult for one firm to maintain freshness in the problem resolution skills of an internally captive staff. Reducing costs by assigning these individuals to other tasks may further dilute skill focus and can cause employee retention problems. The particular selection of vendor tools and products made by any one firm may also limit internal staffing exposure to new and emerging trends.

Vendors in the data storage management industry are pursuing proprietary approaches as a competitive tool to lock customers into vendor products. There currently may be no fully integrated tools that take a multi-vendor and system wide perspective. Firms may currently use a variety of multi-vendor tools and techniques to manage and troubleshoot their data storage systems. Unfortunately, this can add cost and complexity to data storage management. Accordingly, there is a need for improved, lower cost ways of managing data storage management systems.

In recent years, Internet-enabled data storage providers have begun to provide remote data storage for businesses or individuals that cannot afford or who may not need enterprise data management solutions. These companies may take the functionality of personal computer file systems, such as Microsoft's Windows Explorer, to the Internet. Their focus is on the individual consumer and small project teams and may not consider an organization's need to securely manage large volumes or information in customized manners. As data are transmitted over a public data network (e.g., the Internet), security of the data can be compromised. The data can be intercepted, read and/or tampered with in such a manner as to reduce the value of the data. Data residing on hosted Internet-provided file storage systems can be compromised by unauthorized access to that data by personnel nominally responsible for only managing and maintaining the storage of the data.

Increasingly, individuals and small businesses (referred to as "small office, home office" or SOHO) are seeking data storage services. Unfortunately, heretofore, providers of data storage services have not targeted individual and SOHO clients because of the amount of time necessary to initiate data storage services. Moreover, the time required on behalf of individual and SOHO clients to subscribe to data storage services is not insubstantial. For example, currently it may require about thirty to forty minutes of time by an end user and two to three hours of time for a supplier of data storage services to initiate data storage services. The time, complexity and overhead has limited the availability of data storage services to a large segment of the market.

Accordingly, there is a need for lessening the complexity and/or decreasing the time required to subscribe to data storage services.

SUMMARY OF THE INVENTION

Some embodiments of the present invention provide methods of performing remote data storage for a plurality of client devices that are associated with an enterprise. According to these embodiments, an authorization is obtained at a remote data storage system from an administrator of the enterprise, to subscribe the plurality of client devices to the remote data storage system. In response to obtaining the administrator authorization, remote data storage software for the remote data storage system is downloaded to the plurality of client devices. In response to authorization from a given client device, the following are performed automatically at the given client device: installing the remote data storage software, obtaining metadata about the given client device, uploading the metadata to the remote data storage system and initiating an initial remote data storage to the remote data storage system using the metadata that was obtained. In some embodiments, the metadata about the given client device may comprise an address of the given client device and a data storage quantity (size) for the given client device.

In other embodiments, the enterprise is assigned to a plurality of remote data storage devices in the remote data storage system in response to obtaining authorization from the administrator of the enterprise to subscribe the plurality of client devices to the remote data storage system. A load balancing program is executed to programmatically assign the given client device to a subset of the remote data storage devices, in response to obtaining the metadata about the given client device. The initial remote data storage is then initiated by initiating an initial remote data storage to the subset of the remote data storage devices in the remote data storage system.

In still other embodiments, the load balancing program that programmatically assigns the given client device to a subset of the remote data storage devices may perform the following steps programmatically: identifying the plurality of remote data storage devices that are assigned to the enterprise, identifying from the plurality of remote data storage devices that are assigned to the enterprise, candidate remote data storage devices for remote data storage for the given client device, and assigning the given client device to at least one remote data storage device from the candidate remote data storage devices, that is storing data for a fewest number of client devices, if the fewest number of client devices is less than a predetermined number. In other embodiments, the programmatic assigning of the given client device to at least one remote data storage device may further comprise assigning the given client device to at least one remote data storage device from the candidate remote data storage devices, that is storing data for a fewest number of client devices and that also has a lowest ratio of assigned client devices to actual client devices, if the fewest number of client devices is more than the predetermined number.

Programmatic load balancing according to other embodiments of the present invention may be performed independently. Thus, in some embodiments, remote data storage for a plurality of client devices that are associated with an enterprise is performed by assigning the enterprise to a subset of remote data storage devices in a remote data storage system and executing a load balancing program to programmatically assign a given client device that is associated with the entity to at least one of the remote data storage devices in the subset. The load balancing program may be performed as was described above.

Yet other embodiments of the present invention provide methods of performing remote data storage for a plurality of client devices, by performing the following automatically at a given client device in response to authorization from the given client device: obtaining metadata about the given client device, uploading the metadata to a remote data storage system, and initiating remote data storage to the remote data storage system using the metadata that was obtained. A load balancing program may be executed as was described above.

It will be understood by those having skill in the art that embodiments of the present invention have been described above primarily in connection with methods of performing remote data storage for a plurality of client devices. However, in other embodiments, related systems and computer program products for performing remote data storage for a plurality of client devices also may be provided.

It will also be understood by those having skill in the art that embodiments of the present invention have been described above primarily in connection with performing remote data storage for a plurality of client devices. However, other embodiments of the present invention may be used to perform remote storage for an individual client device that is not associated with an enterprise. In these embodiments, authorization may be obtained at a remote data storage system to subscribe the client device to the remote data storage system. In response to obtaining the authorization, remote data storage software is downloaded for the remote data storage system to the client device. In response to authorization from the client device, the following are performed automatically at the client device: installing the remote data storage software, obtaining metadata about the client device, uploading the metadata to the remote data storage system and initiating an initial remote data storage to the remote data storage system using the metadata that was obtained. Load balancing may also be performed to programmatically assign the client device to a subset of the remote data storage devices, as was described above. Related systems and computer program products for performing remote data storage for a client device also may be provided.

Moreover, other embodiments of the present invention may be used to provision a client/server application other than remote data storage. For example, in some embodiments, a data harvesting application or a virus scanning operation may be provisioned to a plurality of client devices that are associated with an enterprise. In these embodiments, authorization is obtained at a server that is associated with the client/server application from an administrator of the enterprise, to subscribe the plurality of client devices to the client/server application. In response to obtaining the administrator authorization, software for the client/server application is downloaded to the plurality of client devices. In response to authorization from a given client device, the following are performed automatically at the given client device: installing the software, obtaining metadata about the given client device, uploading the metadata to the server and initiating an initial execution of the client/server application using the metadata that was obtained. The metadata may vary based on the particular client/server application that is being provisioned. Other embodiments may also be used to provision a client/server application for an individual client device that is not associated with an enterprise. Load balancing may be performed as was described above. Related systems and computer program products for provisioning a client/server application also may be provided.

BRIEF DESCRIPTION OF THE DRAWINGS

FIG. 6, are a flowchart of operations that may be performed to provide remote data storage according to still other embodiments of the present invention.

DETAILED DESCRIPTION

Figure 1:
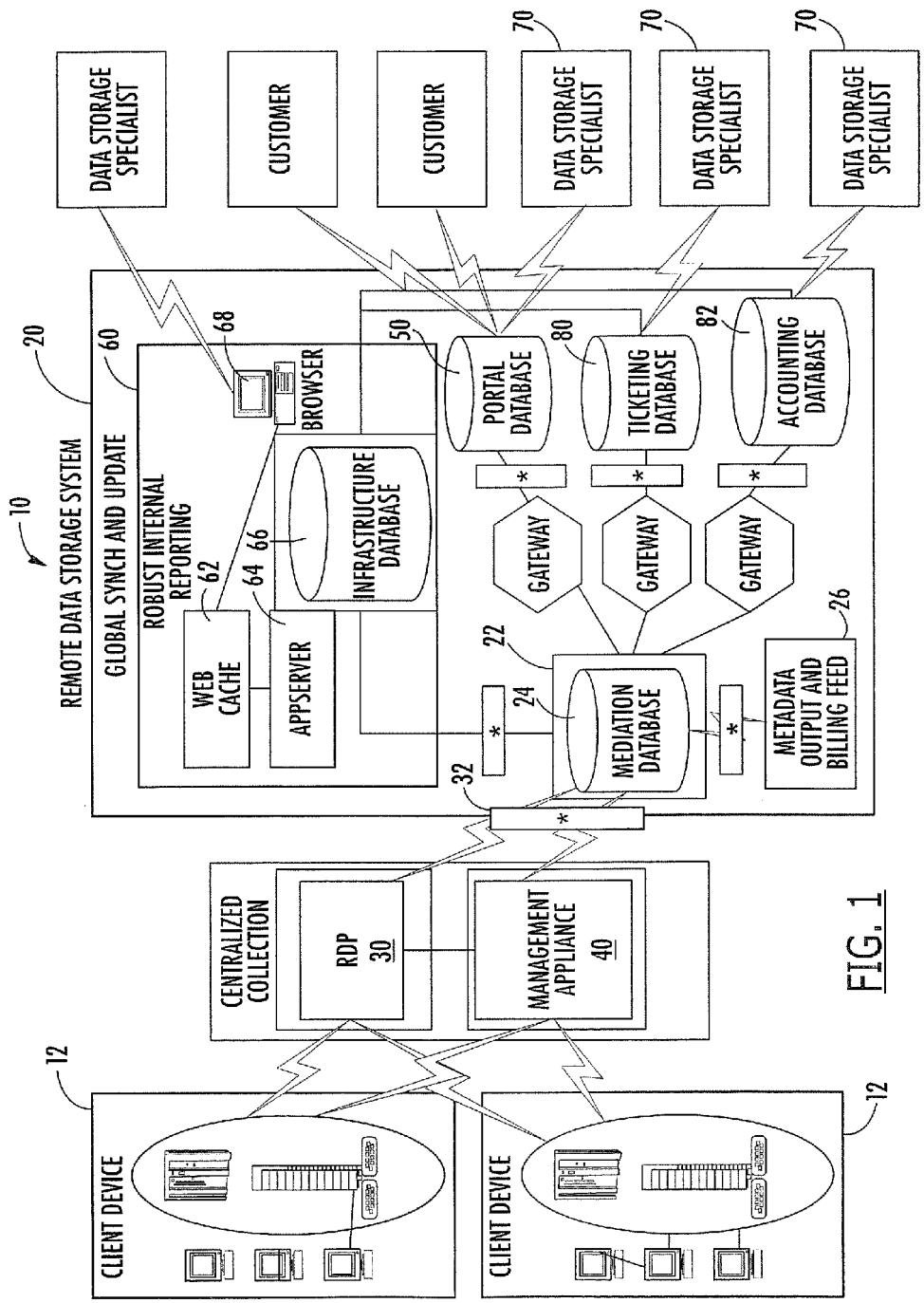
FIG. 1 is a block diagram of a data storage management system for providing and managing customer data, according to some embodiments of the invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The terms "customer data storage system", "customer site" and "client device" are interchangeable and, as used herein, refer to any system where data is stored electronically, in one or more stand-alone data storage devices, networked or otherwise connected data storage devices, in any mainframe, application, personal or pervasive computer system, any intelligent device in any static or mobile location, including but not limited to, corporate offices, internet data centers, distributed systems, centralized systems, branch offices, mobile users, enterprise locations, consumers, etc. It will be understood that these client devices may operate as server devices from the standpoint of their users, but are regarded as client devices from the standpoint of a remote data storage system. Moreover, when used in the context of provisioning a client/server application other than remote data storage, a client device means any system as described above, in which the client/server application is to be run.

The terms "data storage management", "storage management" and "remote data storage" are interchangeable and, as used herein, refer to any type of data storage service including, but not limited to, data backup and recovery, primary data storage, data archiving, business continuity and disaster recovery, and remote data management for client devices. Moreover, "remote" means outside the client device, and does not indicate a specific geographic separation.

The term "agent", as used herein, refers to a network-based program (or programs) that gathers information and/or performs some service, typically according to a schedule and without requiring a user's presence.

The term "enterprise" refers to an entity such as a business that includes a plurality of client devices and/or a third party that offers remote data storage management services for a plurality of client devices which themselves may be associated with an enterprise and/or may be associated with individual users.

As used herein, the term "and/or" includes any and all combinations of one or more of the associated listed items.

The present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in a high-level programming language, such as C or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. However, software embodiments of the present invention do not depend on implementation with a particular programming language. It will be further appreciated that the functionality of any or all of the program modules may also be implemented using discrete hardware components, one or more application specific integrated circuits (ASICs), or a programmed digital signal processor or microcontroller.

The present invention is described below with reference to block diagram and flowchart illustrations of methods, apparatus (systems) and computer program products according to embodiments of the invention. It will be understood that each block of the block diagrams and/or flowchart illustrations, and combinations of blocks, can be implemented by computer program instructions and/or hardware operations. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block diagram and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process or method such that the instructions which execute on the computer or other programmable apparatus provide steps for implementing the functions specified in the block diagram and/or flowchart block or blocks.

It should be noted that, in some alternative embodiments of the present invention, the functions noted in the blocks may occur out of the order noted in the figures. For example, two blocks shown in succession may in fact be executed substantially concurrently or the blocks may sometimes be executed in the reverse order, depending on the functionality involved. Furthermore, in certain embodiments of the present invention, such as object oriented programming embodiments, the sequential nature of the flowcharts may be replaced with an object model such that operations and/or functions may be performed in parallel or sequentially.

Referring to FIG. 1, a remote data storage system 10 for managing a plurality of client devices 12 is illustrated. The remote data storage system 10 is capable of communicating with each client device 12, and providing data storage services for each client device 12 (e.g., data backup services, data restore services, etc.). Customers can access information regarding their specific client devices 12 and request changes and services through a respective web portal that utilizes an individually customized interface and appearance of a dedicated management system.

The illustrated remote data storage system 10 includes a control center 20 having a central data repository 22, a Raw Data Processor (RDP) 30, a management appliance 40, a plurality of web portals implemented by a portal database 50, and a data mining and reporting system 60. The illustrated data storage management system 10 is described in detail in U.S. Patent Application Publication No. 2006/0004830 entitled Agent-Less Systems, Methods and Computer Program Products for Managing a Plurality of Remotely Located Data Storage Systems, assigned to the assignee of the present invention, the disclosure of which is hereby incorporated herein by reference in its entirety as if set forth fully herein.

Some embodiments of the present invention can streamline subscribing of customers to data storage services, such as data storage services provided by, for example, the remote data storage system 10 of FIG. 1. Referred to as "streamlined provisioning", some embodiments of the present invention can simplify the data storage service installation process, decrease the time for installation from hours to seconds, and/or significantly reduce user time and involvement in the process. Moreover, streamlined provisioning can reduce or eliminate human error and can allow greater scalability by allowing the addition of many client devices to data storage services in parallel. Streamlined provisioning can be used to perform data storage for a plurality of client devices that are associated with an enterprise, in some embodiments. In other embodiments, streamlined provisioning may be used with a client device or devices associated with a single user. Moreover, in still other embodiments, streamlined provisioning can be used to provision a client/server application other than remote data storage.

Embodiments of the present invention can provide an easy to use interface that "walks" a user through each installation step, communicates necessary information and gathers technical information such as hostname, IP address, data storage quantity, etc., also collectively referred to herein as "metadata", directly from a client device, instead of having the user obtain and provide the information. The metadata will vary depending upon the particular type of application that is being provisioned.

Figure 2:
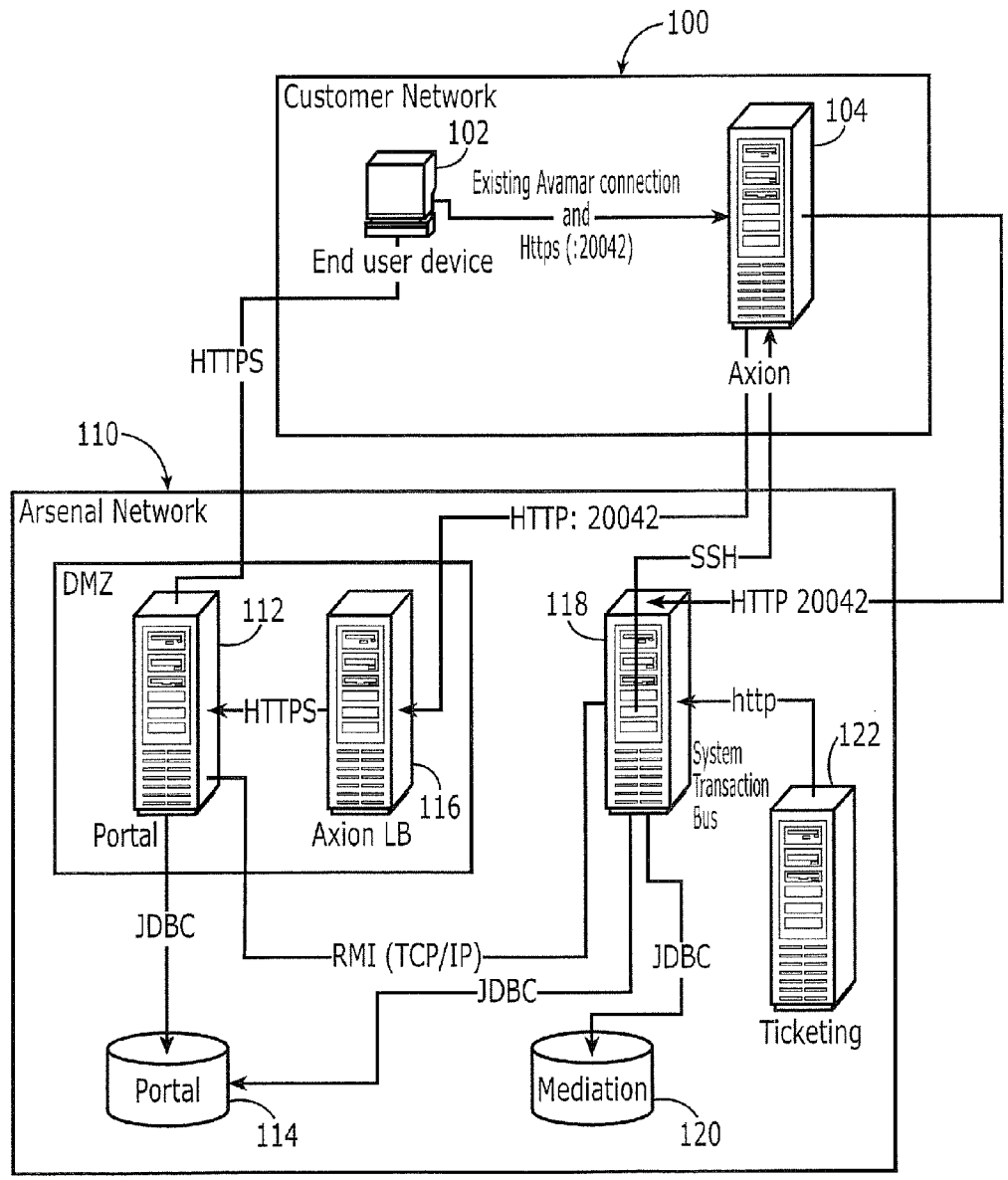
FIG. 2 is a block diagram of a system for subscribing customers to data storage services, according to some embodiments of the present invention.

FIG. 2 is a block diagram of an exemplary system for implementing streamlined provisioning according to other embodiments of the present invention. FIG. 2 illustrates a customer network 100 and a remote data storage system embodied as a network 110 of a data storage management service provider implementing streamlined provisioning. The illustrated customer network 100 includes an end user device 102, also referred to as a "client device", and a data storage device/service 104. The illustrated data storage device/service 104 is Axion®, a product of Avamar Technologies, Inc. As is known to those of skill in the art, Axion is a disk backup and recovery solution that moves and stores data on a server. The illustrated network 110 of a data storage management service provider includes a portal 112 that interfaces with the end user device 102, a portal database 114, a component 116 that interfaces with the Axion data storage device/service 104, and a system transaction bus 118 that interfaces with a mediation database 120, the portal database 114, the portal 112, the data storage device/service 104, and a ticketing system 122.

The portal 112 provides customer or user access to initiate data storage management services and subsequently provides customer access to information about the customer's data storage system 104 in graphical and report-based formats, and allows customer control and configuration of the data storage system 104. In addition, the portal 112 provides users (i.e., customers and data storage specialists) with web-based access to system performance information and status, and can be used to request services and make system changes. Customized to the desires and needs of each individual user, the data storage management system 110 can appear to the user, via a web portal, as a dedicated private storage management service. Each web portal can provide users with reports by month, week, or day for disk allocation, backup size, and/or restore size. Each web portal also can provide user access to total and average daily volume and usage, and to total volume by location by server. Each web portal can be utilized to retrieve metrics on a given location, server, or volume; view historical usage to understand future costs; and view alerts and messages on system status. Exemplary portals and ticketing systems are described in the above-incorporated U.S. Patent Application Publication No. 2006/0004830.

Embodiments of the present invention are not limited to the illustrated components/elements of FIG. 1 or 2. Streamlined provisioning according to embodiments of the present invention may be performed using various device/component configurations and arrangements.

Figure 3:
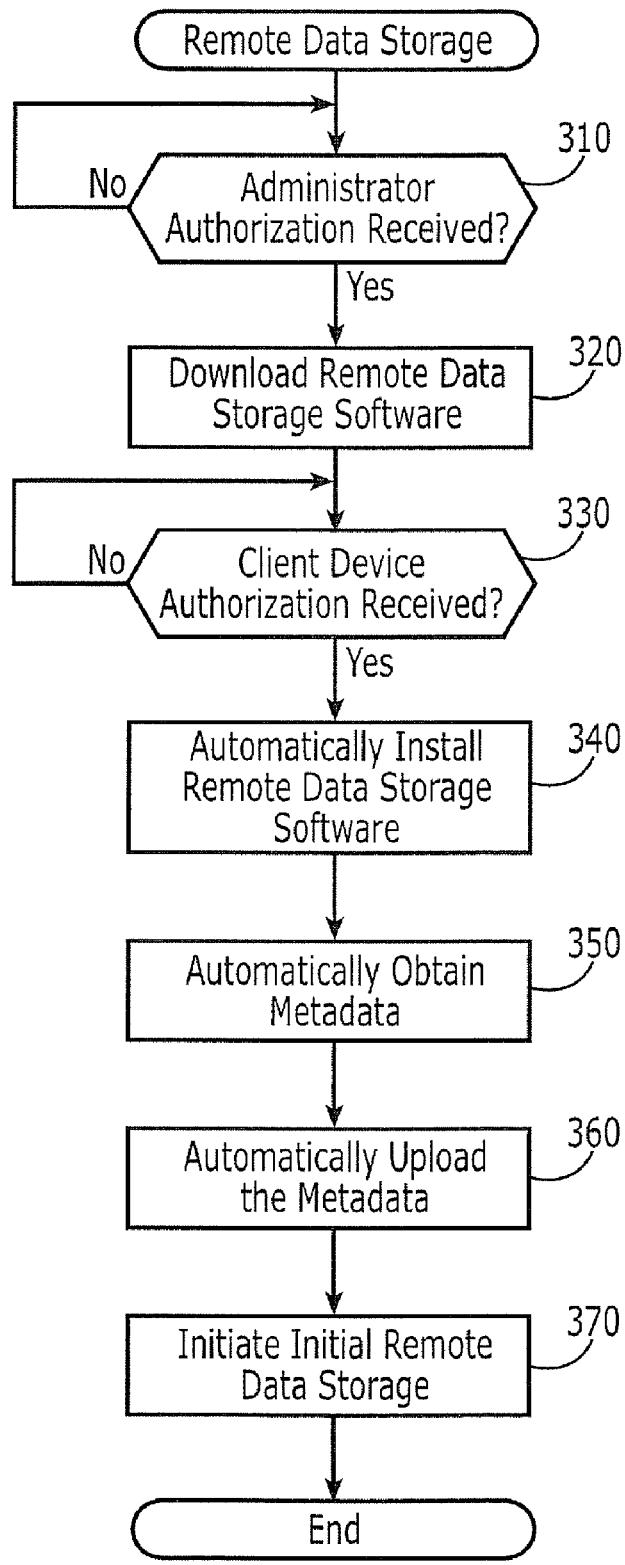
FIGS. 3 and 4 are flowcharts of operations that may be performed to provide remote data storage according to various embodiments of the present invention.

FIG. 3 is a flowchart of operations for performing remote data storage for a plurality of client devices that are associated with an enterprise according to various embodiments of the present invention. These embodiments may be performed using systems of FIGS. 1, 2 and/or other remote data storage systems and client devices.

Referring to FIG. 3, at Block 310, authorization is obtained at a remote data storage system from an administrator of an enterprise to subscribe the plurality of client devices to the remote data storage system. At Block 320, in response to obtaining the administrator authorization at Block 310, remote data software for the remote data storage system is downloaded to the plurality of client devices. Then, at Block 330, a determination is made as to whether an authorization from a given client device is received. Upon receiving the given client device authorization at Block 330, operations at Blocks 340, 350, 360 and 370 are performed automatically at the given client device. More specifically, at Block 340, the remote data storage software is automatically installed at the given client device. Metadata about the given client device is obtained at Block 350. The metadata may include a host name, an IP address, a data storage quantity and/or other parameters of the given client device that may impact remote data storage. At Block 360, the metadata is automatically uploaded to the remote data storage system. Finally, at Block 370, an initial remote data storage to the remote data storage system is initiated using the metadata that was obtained at Block 360.

Figure 4:
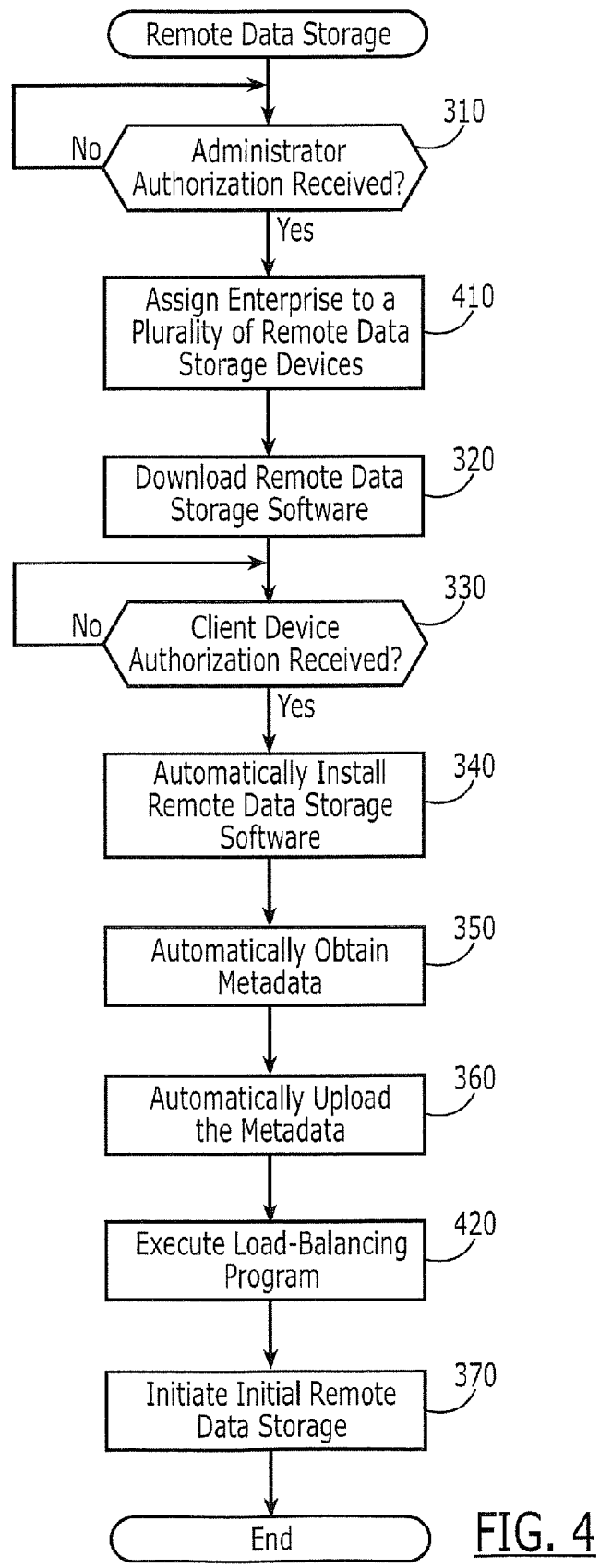

FIG. 4 is a flowchart of operations that may be performed for remote data storage according to other embodiments of the present invention. In these embodiments, after administrator authorization is received at Block 310, the enterprise is assigned to a plurality of remote data storage devices in the remote data storage system at Block 410. Moreover, upon automatically uploading the metadata at Block 360, a load balancing program is executed at Block 420, to programmatically assign the given client device to a subset of the remote data storage devices. At Block 370, the initial remote data storage is performed to the subset of the remote data storage devices in the remote data storage system.

FIGS. 3 and 4 also illustrate embodiments of the present invention that can provision a client/server application other than remote storage for a plurality of client devices that are associated with an enterprise. In these embodiments, administrator authorization may be received at a server of the client/server application at Block 310, and software for the client/server application may be downloaded at Block 320. The software may be an agent, stub, applet and/or other client side software that is used in connection with the client/server application. In response to client device authorization at Block 330, the software is automatically installed (Block 340), metadata is obtained (Block 350), the metadata is automatically uploaded to the server (Block 360) and an initial execution of the client/server application is initiated using the metadata that was obtained (Block 370).

Moreover, FIGS. 3 and 4 also illustrate embodiments of the present invention wherein only a single client device is provisioned. In these embodiments, at Block 310, authorization need not be obtained from an administrator but, rather, may be obtained from the user of the client device. Operations of Blocks 320-370 may then be performed relative to the client device.

Figure 5:
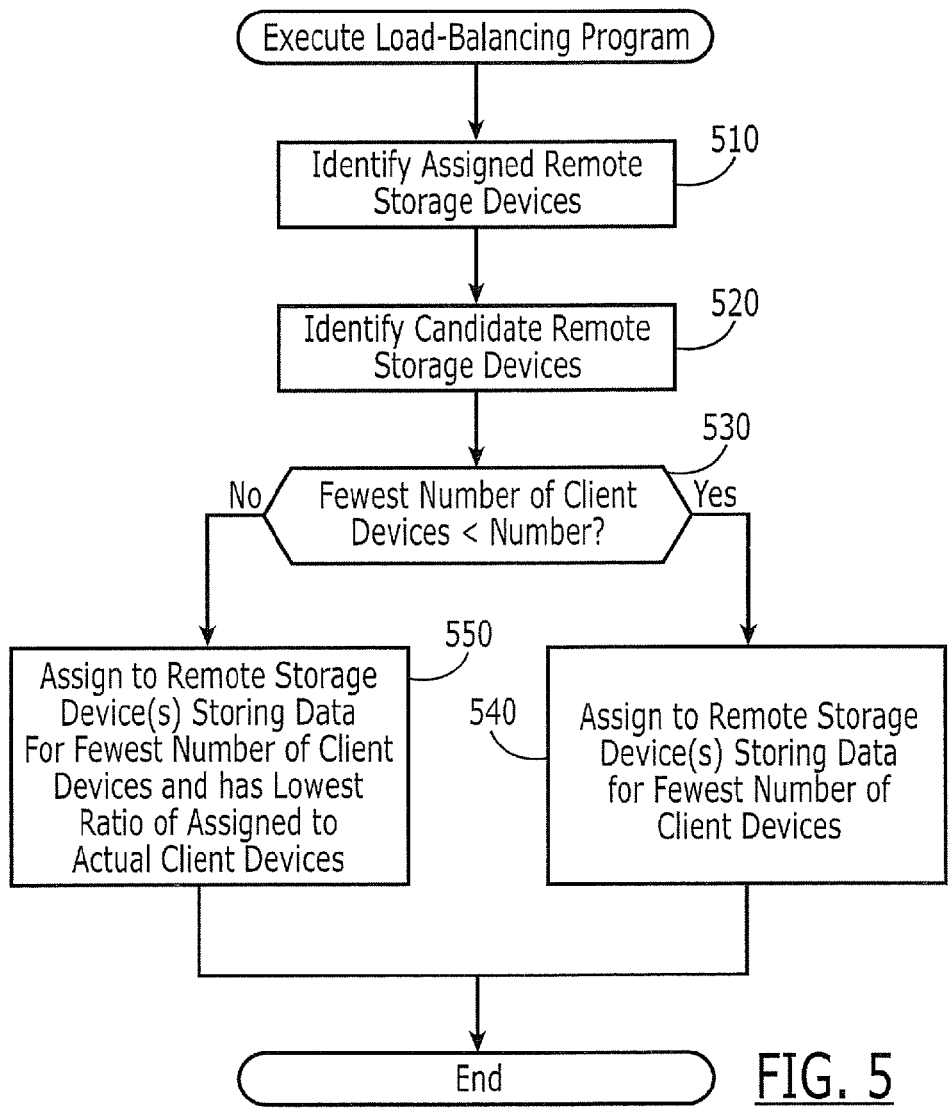
FIG. 5 is a flowchart of operations that may be performed to provide load balancing according to various embodiments of the present invention.

FIG. 5 is a flowchart of operations that may be performed to execute a load balancing program according to various embodiments of the present invention. These operations may correspond to Block 420 of FIG. 4, but also may be performed independently of operations of FIG. 4, according to other embodiments of the present invention.

Referring to FIG. 5, at Block 510, a plurality of remote data storage devices that are assigned to the enterprise are identified. At Block 520, candidate remote data storage devices for remote data storage for the given client device are identified from the plurality of remote data storage devices that are assigned to the enterprise. Then, at Block 530, a determination is made as to whether the fewest number of client devices is less than a predetermined number. If so, at Block 540, the given client device is assigned to at least one remote data storage device from the candidate remote storage devices, that is storing data for a fewest number of client devices. If not, then at Block 550, the given client device is assigned to at least one remote storage device from the candidate remote storage devices, that is storing data for a fewest number of client devices, and that also has a lowest ratio of assigned client devices to actual client devices.

Additional discussion of load balancing according to various embodiments of the present invention will now be provided. In particular, programmatic load balancing according to some embodiments of the present invention can determine a particular remote data storage device or devices to which a given client device will be assigned. The remote data storage device(s) may include a physical device and/or a logical device. The logical device can include a portion of a physical device, a single physical device or a group of physical devices. Programmatic assignment may take into account the geographic location of the given client device versus the remote data storage device. Rules may set how close or how far away the given client device may be from the remote data storage device. Load balancing may also assess a determination of logical banks that are assigned to a given market (e.g., SOHO, small business or large business) and/or to a given enterprise. In other embodiments, load balancing may be performed across geographical banks. Load balancing may also take into account the status of remote storage devices within logical banks. Finally, load balancing may assess storage device activity. Example activities according to various embodiments of the present invention can include the number of steady state client devices and their size, the number of staged client devices that are not yet active, the number of total client devices, and/or the priority of the given remote data storage device, which may be a function of the size, speed, concurrent activity capabilities and/or other properties of the individual remote data storage device. Other embodiments may also take into account planned maintenance activity and/or availability of a given remote data storage device.

Some embodiments of the present invention may programmatically perform the following operations to perform load balancing:

1. Obtain list of Service Platforms or remote storage devices owned by or assigned to the enterprise. This may correspond to Block 510 of FIG. 5.
2. Drop all devices in list that do not service clients.
3. Drop all devices in list that are inactive.
4. Drop all devices in list that are not provisionable.

Operations 2, 3 and 4 above may eliminate remote data storage devices such as hot spares, devices that are being maintained or are otherwise not presently able to be used (for example, capacity exceeded), to obtain a list of candidate remote storage devices (which may correspond to Block 520 of FIG. 5) from the assigned remote storage devices (which may correspond to Block 510 of FIG. 5).

5. Sort list by total number of clients (tcN) ascending:
    if tc1>tc2 usage, swap ax1 w/ax2
    else, do nothing.
6. If the remote data storage device on the top of the list has 15 (or another predetermined number) or more staged clients, then sort the list by the ratio (rN) of the number of staged clients (sN) divided by the number of steady state clients multiplied by the total number of clients and sort with the number of staged clients:
    if r1>r2 and s1>s2 staged, swap ax1 w/ax2
    else, do nothing.

7. Sort list by the priority (pN) and total number of clients (tcN) on the remote data storage device:
    if p1<p2 priority and tc1<tc2, swap ax1 w/ax2
    else, do nothing.

Operations 5 and 6 above may correspond to the operations of Blocks 530, 540 and 550 of FIG. 5.

Figure 6A:
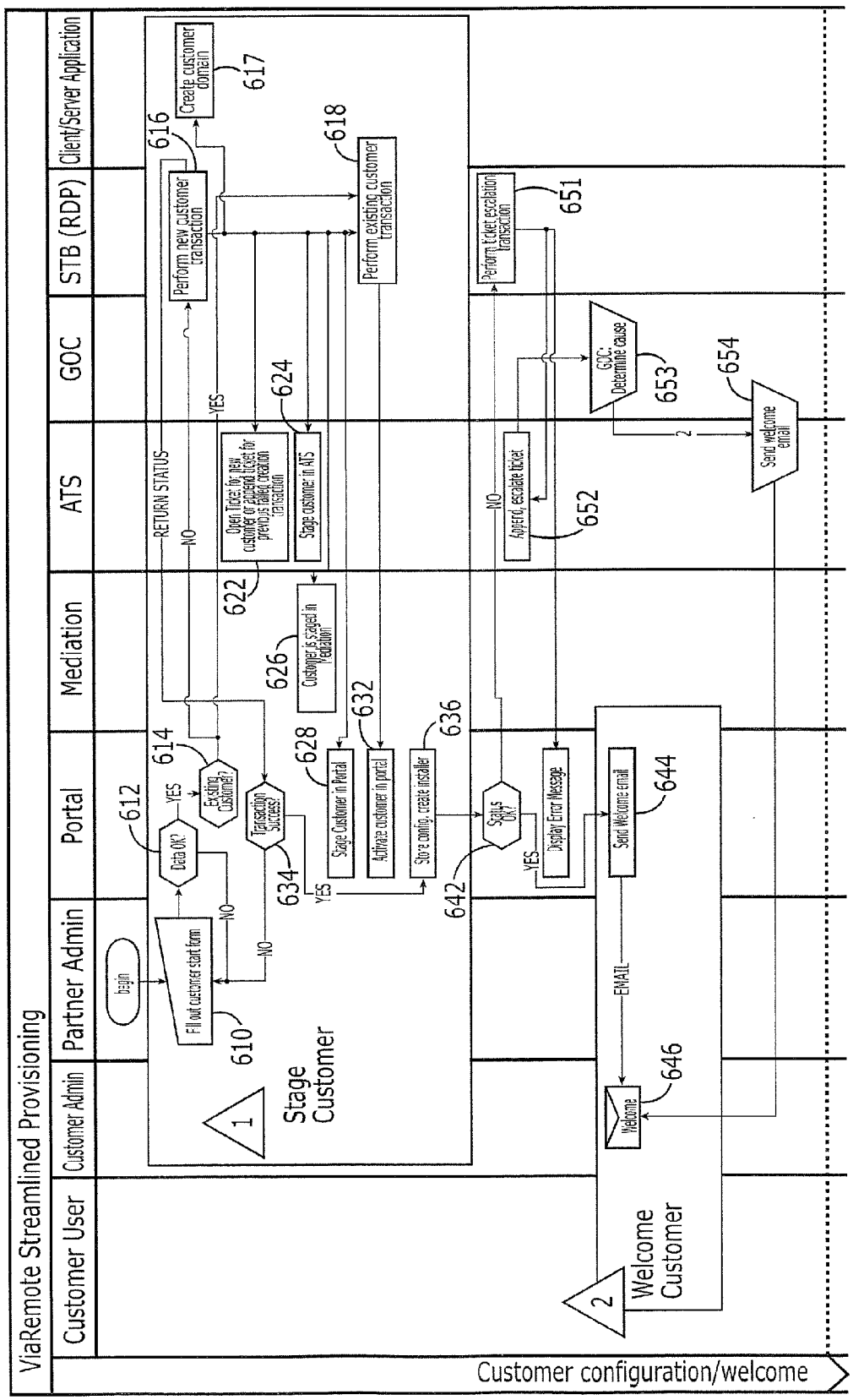
FIGS. 6A-6D, which collectively form
Figure 6B:
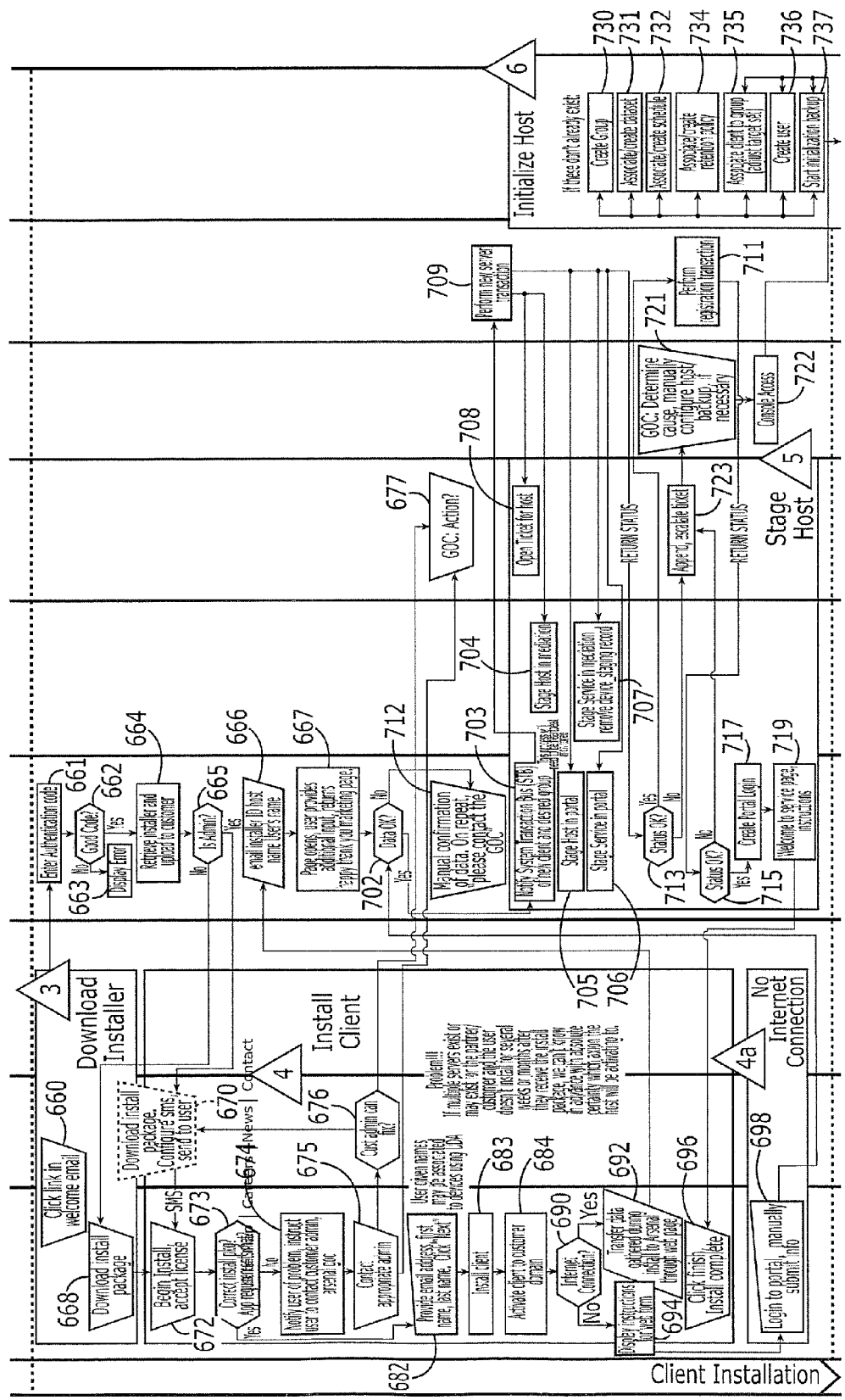
Figure 6C:
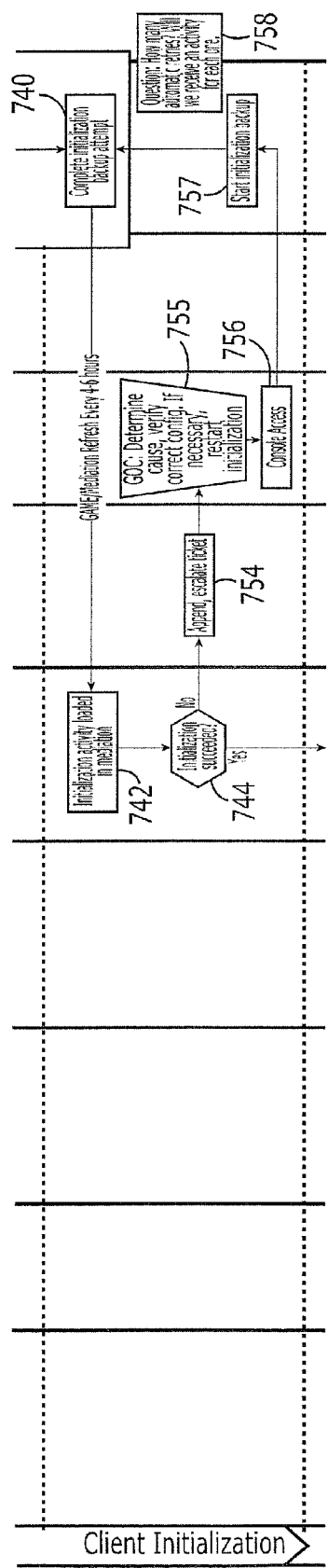
Figure 6D:
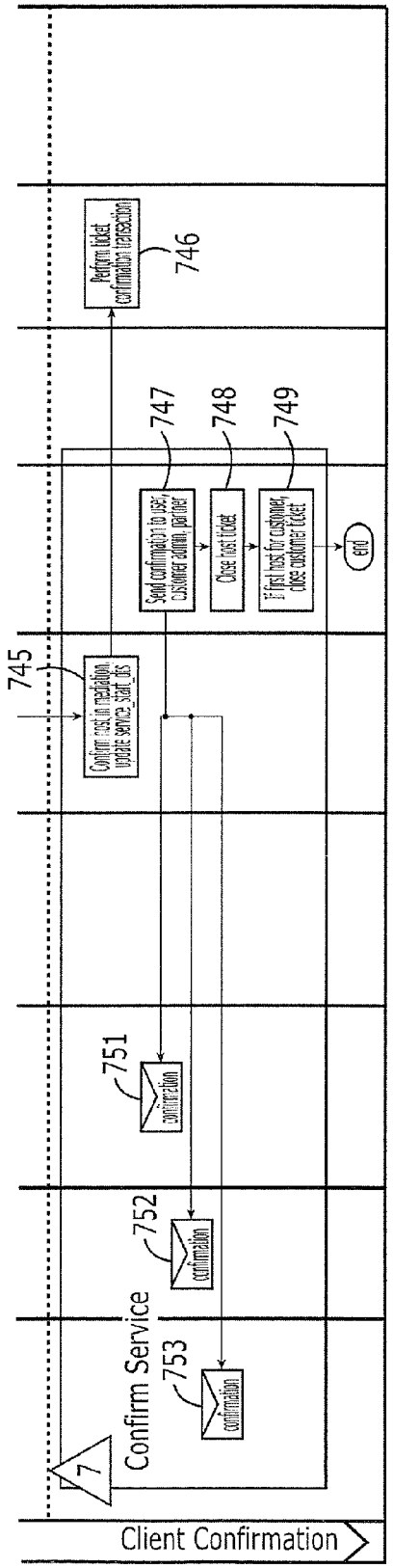

Referring to FIGS. 6A-6D, which collectively form FIG. 6, methods, systems and computer program products for streamlined provisioning (i.e., subscribing client devices to remote data storage services), according to some embodiments of the present invention are illustrated. FIGS. 6A-6D are organized into four major segments: customer configuration/welcome (FIG. 6A), client installation (FIG. 6B), client initialization (FIG. 6C) and client confirmation (FIG. 6D). Operations in each segment may be performed by and/or in conjunction with components/elements of FIGS. 1, 2 and/or other remote data storage systems/client devices.

Referring generally to customer configuration/welcome of FIG. 6A, a customer (user) who wants to sign up for data storage management services initially fills out a customer form. The customer provides various information including, but not limited to, contact information and default service parameters. The new customer is then "staged" by the data storage management service provider and welcomed to the service. An electronic message (e.g., an email message) is transmitted to the customer that contains a link to a downloadable client application.

Referring generally to client installation of FIG. 6B, when the customer activates the link in the electronic message, a client application is downloaded to the customer's client device 102 (FIG. 2) and installed thereon. The client application is configured to gather technical information, also referred to as "metadata" (e.g., hostname, IP address, etc.), directly from a client device. The client application is also configured to provide customer access to the data storage management service 110, for example via the portal 112. During application installation, the customer is permitted to make various configuration changes as necessary or desired. The client application, once installed, allows the customer to access the data storage management service 110, for example via the portal 112.

"Staging" of the new customer generally refers to initializing the various components/elements of the remote data storage system 110 to handle/provide the data storage services for the new customer. When the new customer has been staged, customer initialization takes place (FIG. 6C) and the new customer is sent an electronic message confirming that data storage management services for the customer have been established and the customer can begin using the services (FIG. 6D).

More specifically, FIGS. 6A-6D illustrate streamlined provisioning according to various embodiments of the present invention. As shown by the columns of FIGS. 6A-6D, interaction takes place among a customer user, customer administrator, partner administrator, portal, mediation, ATS, GOC, STB (RDP), and a client/server application. The "customer user" refers to the end user who operates a client device for which remote data storage will be performed. The "customer administrator" refers to a single point of contact for an enterprise who may be part of a data processing or information systems function. The "partner administrator" refers to a direct sales partner who may perform direct sales to enterprises and/or individual end users, and who acts as an interface for the end users. Customer administrators and partner administrators may be referred to collectively as "administrators". The "portal" may be embodied by the portal 112 of FIG. 2. "Mediation" may be embodied by the database 120 of FIG. 2, and refers to a data warehouse that may include metadata concerning the client devices. "ATS" refers to an automatic ticketing/tracking system and may be embodied by the device 122 of FIG. 2. "GOC" refers to a global operations center and may correspond to a user support center for the remote data storage system that provides manual support when needed. Finally, "STB" refers to a system transaction bus which may be embodied as the device 118 of FIG. 2.

Figure 7A:
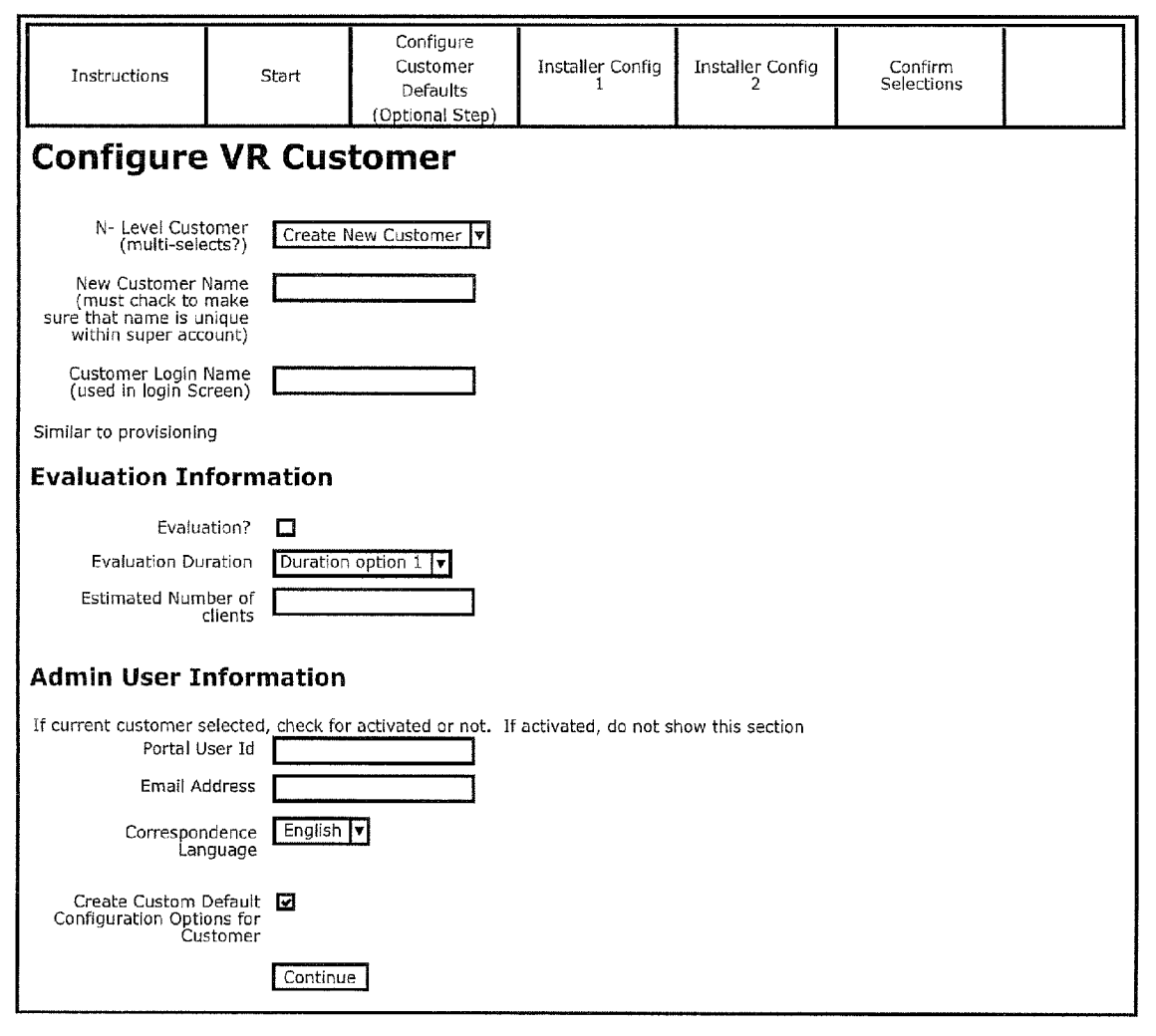
Figure 7C:
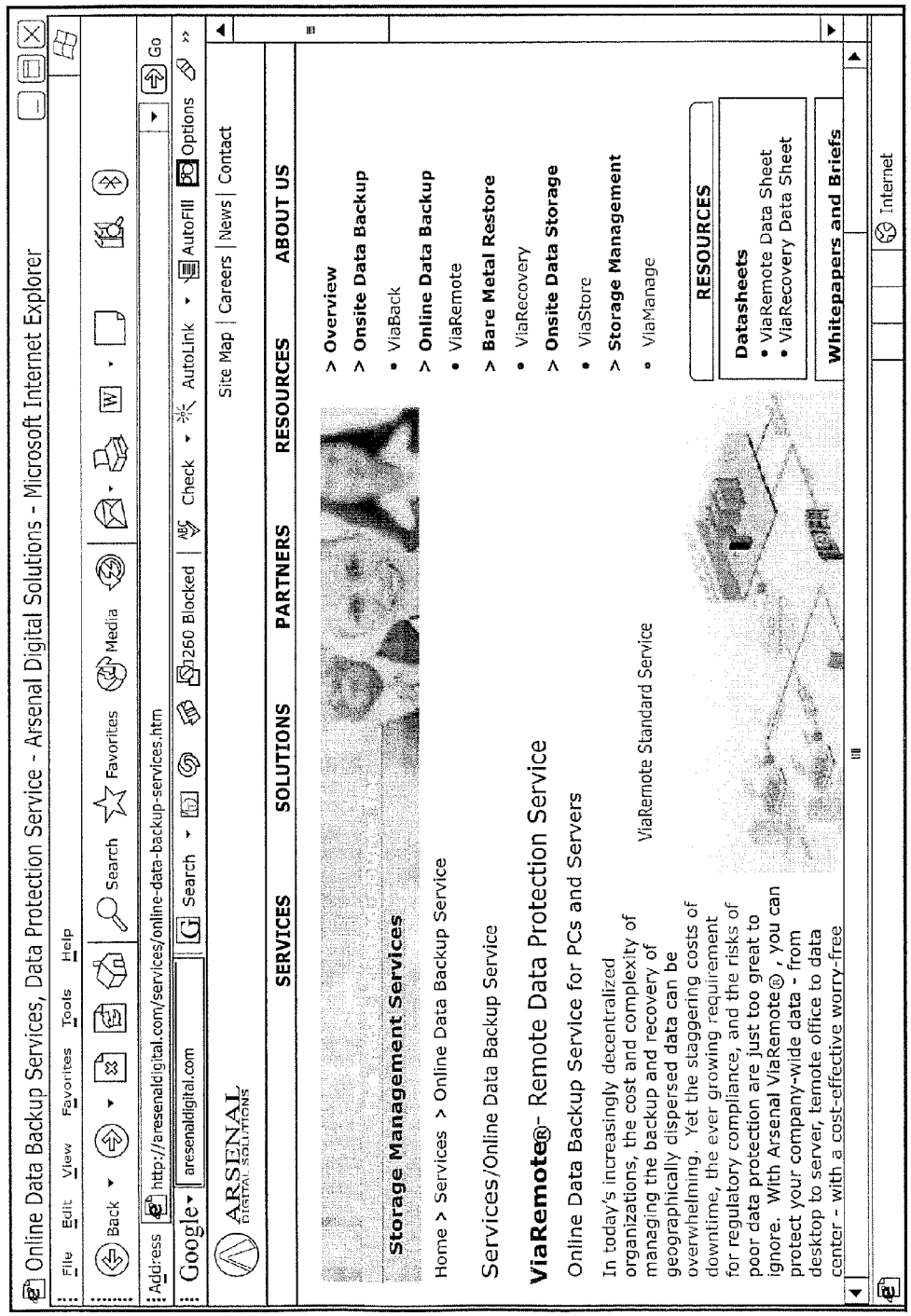
FIGS. 7A-7R are screen shots of user interfaces that may be displayed in connection with embodiments of FIG. 6.
Figure 7D:
Figure 7E:
Figure 7G:

Referring now to FIG. 6A, staging the customer (user) and welcoming the customer according to some embodiments of the present invention will now be described. For purposes of FIG. 6A, it will be assumed that the customer is brought to the remote data storage service by a third party administrator. The remote data storage system may also be referred to herein as "Arsenal" or "ViaRemote". At Block 610, the partner administrator fills out a customer start form that is illustrated, for example, in FIG. 7A or 7B. A determination is made at Block 612 as to whether the data that was entered is acceptable and, if so, a determination is made at Block 614 as to whether an existing or new customer is present. If a new customer, a new customer transaction is then performed at Blocks 616 and 617 to place this new customer into the system. If an existing customer, a transaction is performed at Block 618. As part of this transaction, a ticket is opened at Block 622, the customer is staged at Blocks 624, 626 and 628, and is activated at Block 632. Assuming a successful transaction at Block 634, then an installer is created at Block 636. Accordingly, operations to stage a customer can configure a portal customer and user account for an administrator, can create partner branded installer packages and can perform preliminary configuration on a service platform. If status is OK at Block 642, then a welcome email is sent at Blocks 644 and 646. If the status was not OK at Block 642, manual operations may be performed at Blocks 651, 652, 653, 654 and 655, as needed.

Figure 7H:

FIGS. 7C-7G illustrate user interfaces that may be used to directly order remote data storage services via an e-commerce website, and FIG. 7H illustrates an example of a welcome email that may be sent at Block 644. Analogous operations/user interfaces may be used to stage a plurality of client devices by a customer administrator for an enterprise.

Figure 7I:
Figure 7J:
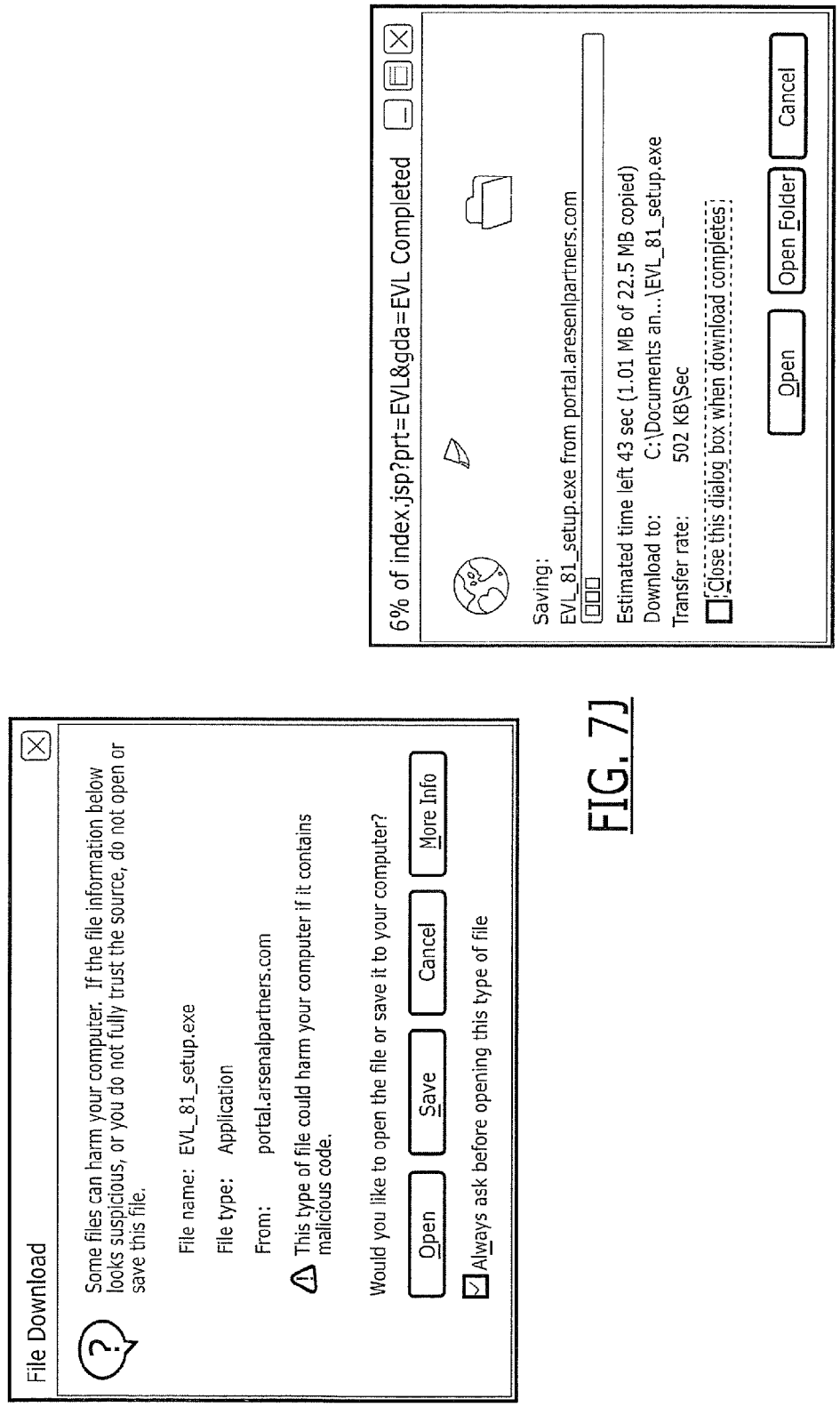
Figure 7K:
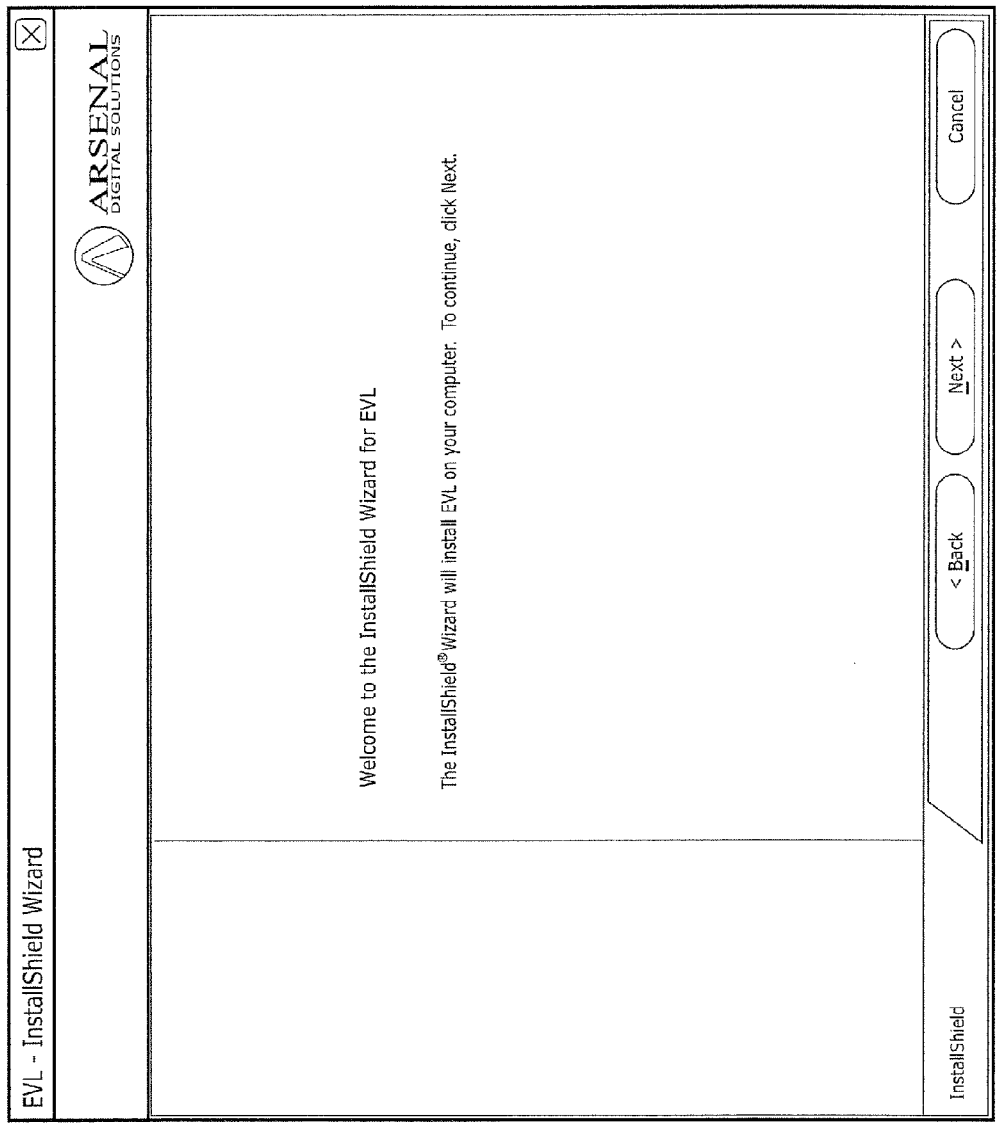
Figure 7L:
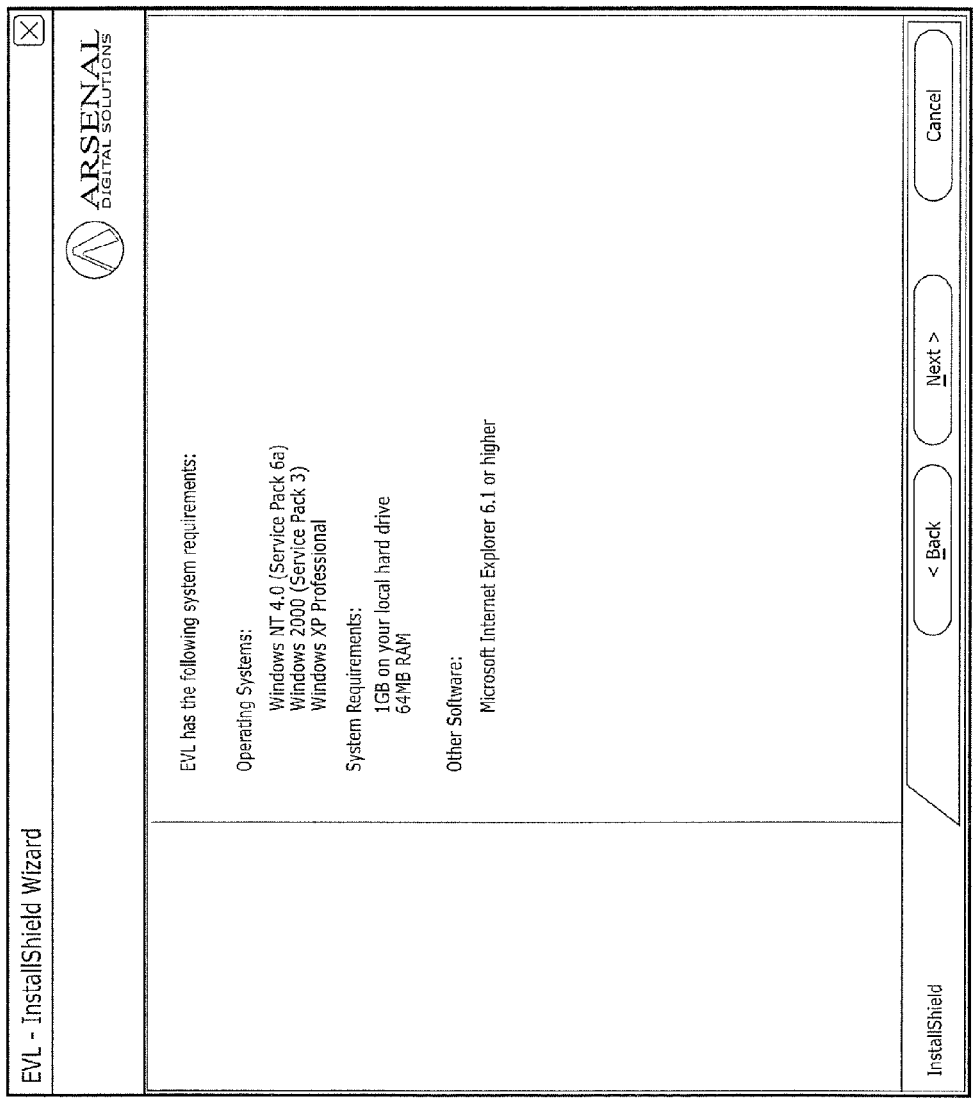
Figure 7M:
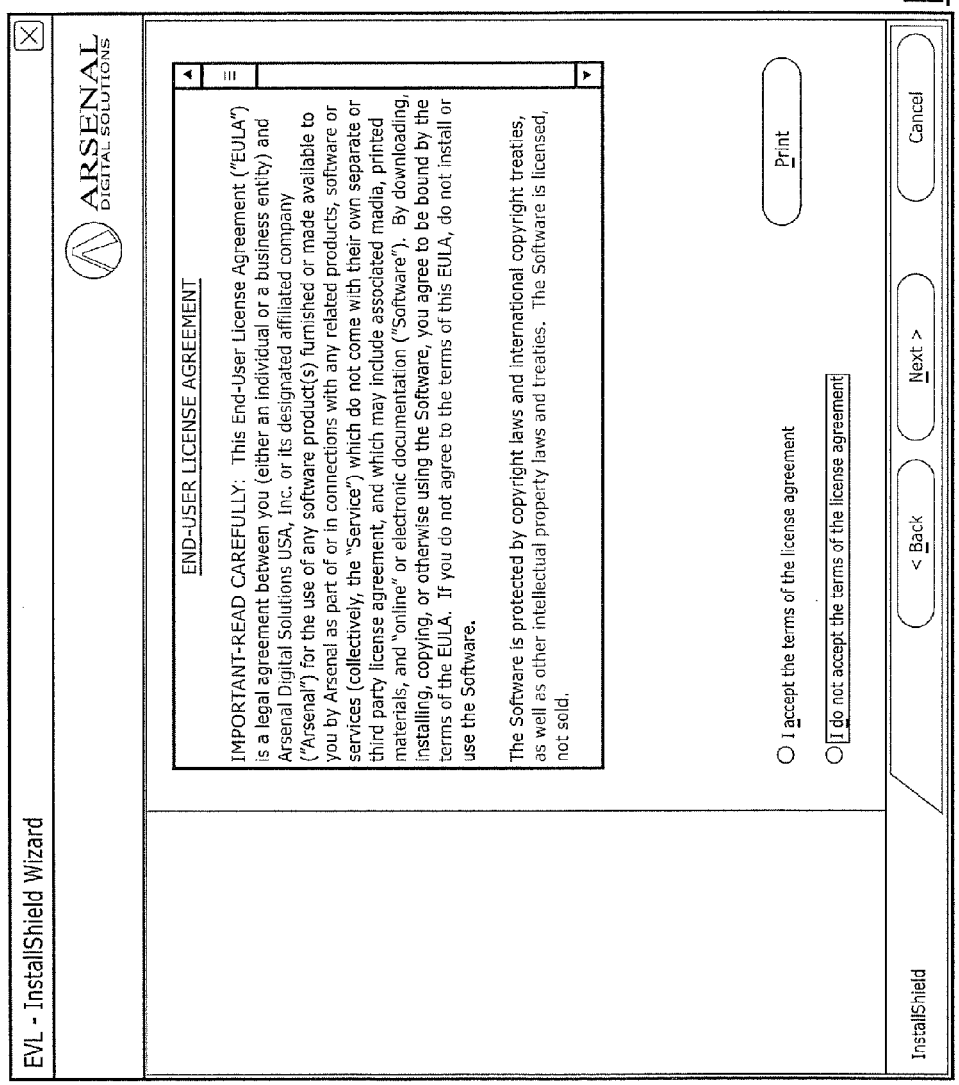
Figure 7N:
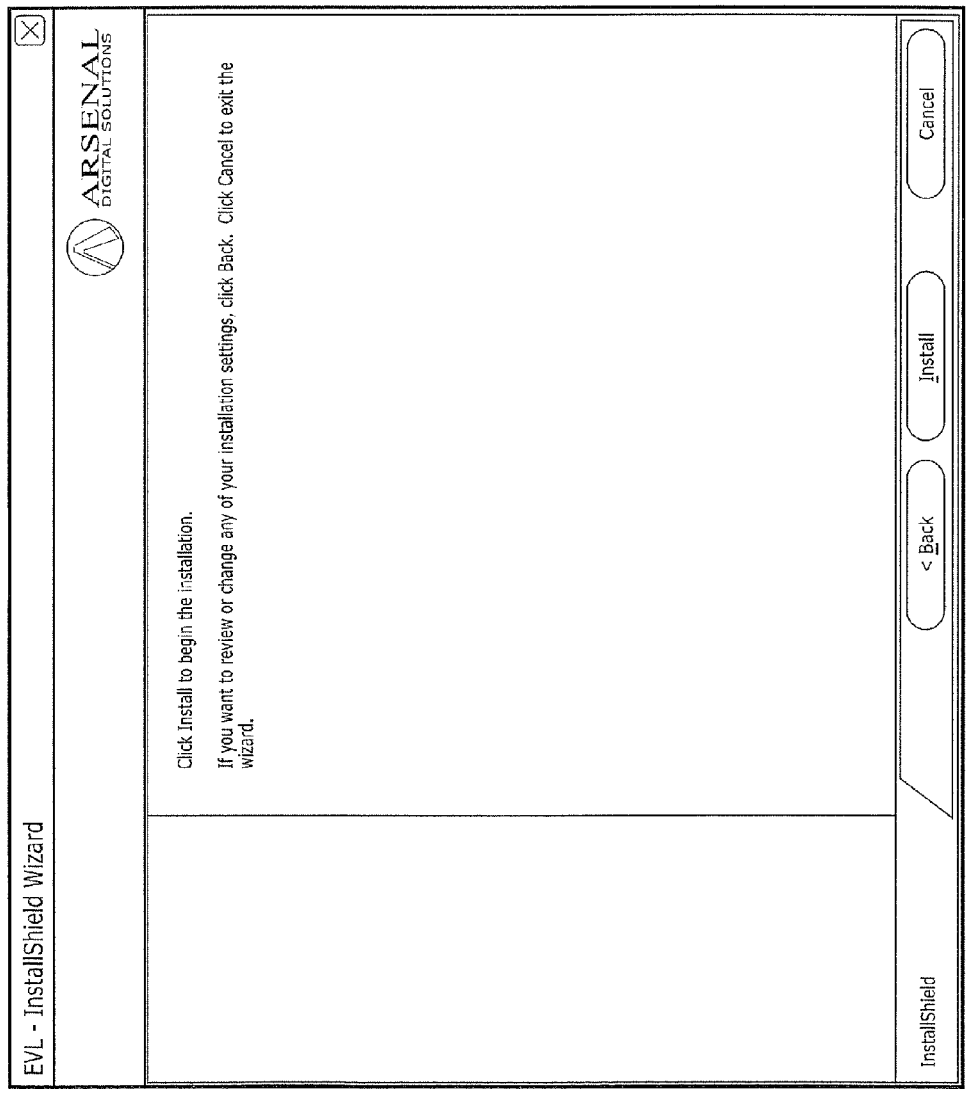
Figure 70:
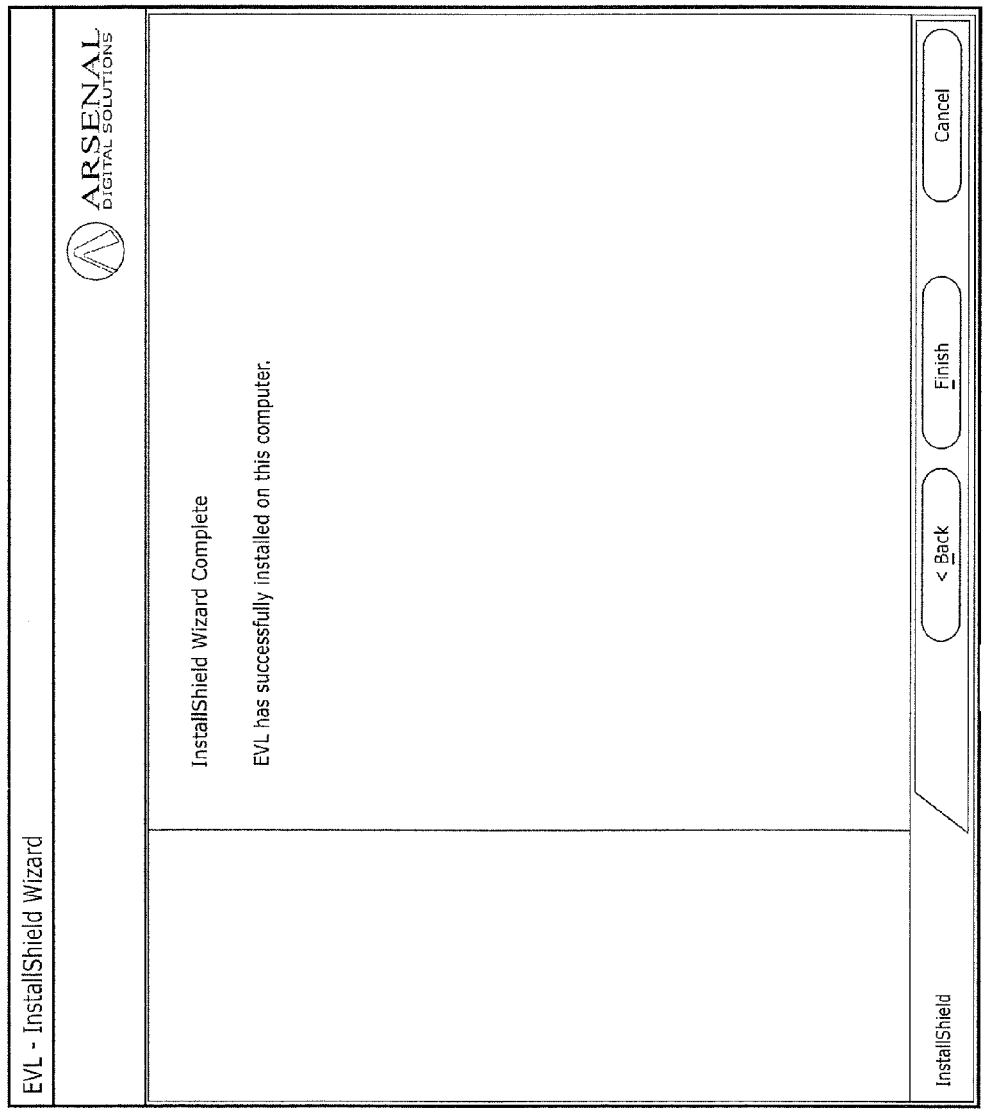

Referring now to FIG. 6B, in order to download the installer, at Block 660, a link in a welcome email may be clicked as shown, for example, in FIG. 7I. An authentication code may be entered and processed if desired, at Blocks 661-665. At Block 677, the install package is downloaded as shown, for example, at FIG. 7J. The software is then installed at Block 672, as shown in FIGS. 7K, 7L, 7M and 7N. Manual processing may be performed if there is a problem at Blocks 673, 674, 675, 676 and 677. The installation process continues at Block 682, 683 and 684, and may provide a user confirmation as shown in FIG. 7O.

Figure 7P:
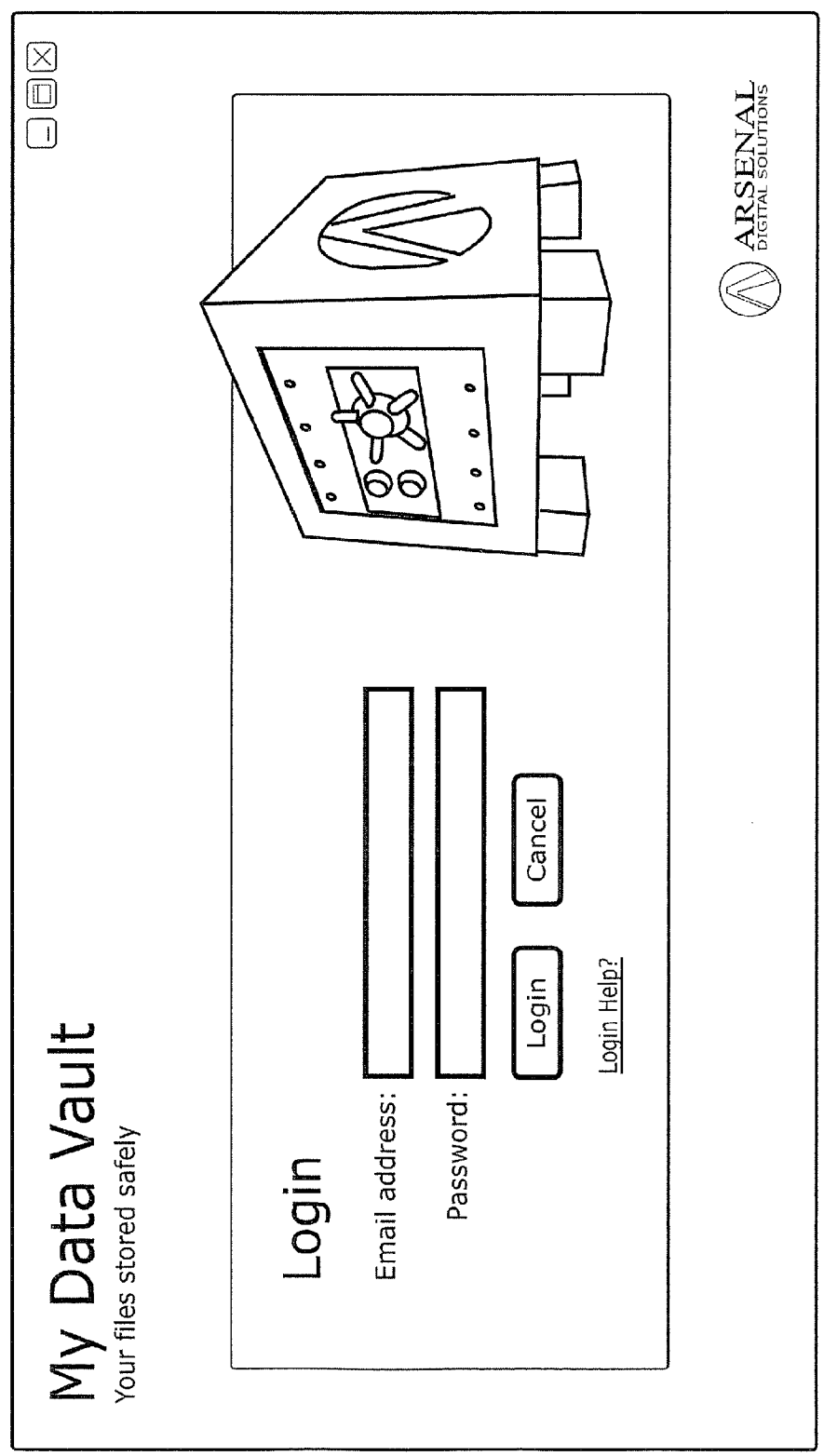
Figure 7Q:
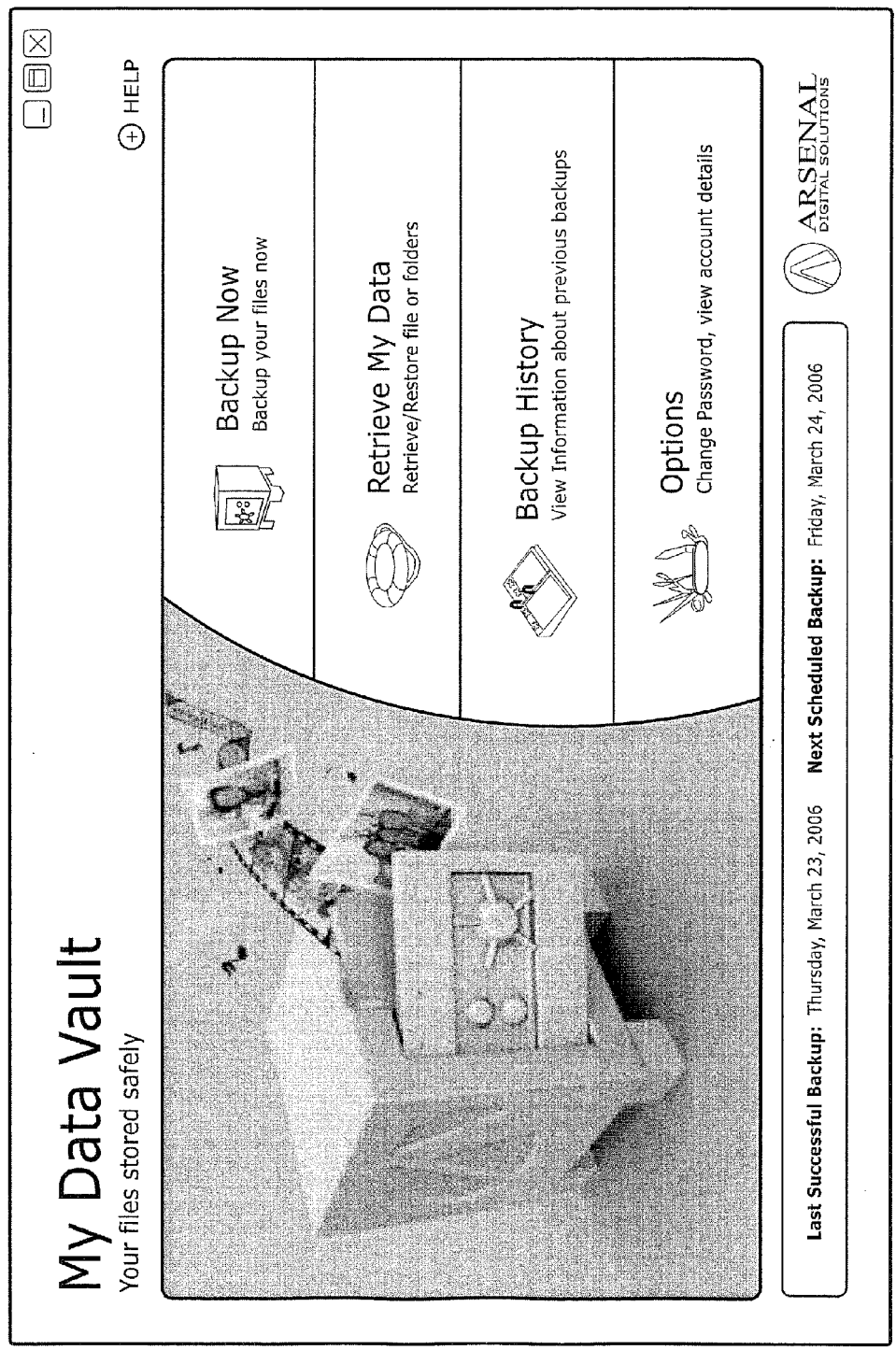

Assuming an Internet connection is present at Block 690, then data about the client that was gathered during the install (also referred to as "metadata") is uploaded at Blocks 692, 666 and 667. If an Internet connection is not available at Block 690, then manual entry may be performed at Blocks 695, 696 and 698. The metadata that was uploaded is then processed at the remote data storage system at Blocks 702 and 712. Assuming the metadata that is obtained is acceptable, then staging is performed by staging the STB at Block 703, staging the host in mediation at Block 704, staging the host in the portal at Block 705, staging the service in the portal at Block 706, staging the device in mediation at Block 707, opening a ticket at Block 708, performing new server transactions at Block 709 and performing a registration transaction at Block 711. If any of these operations fail, manual operations may be performed at Blocks 721, 722 and 723. Moreover, as part of the operations at Block 703, load balancing may be performed as was described above in connection with FIG. 5, so that the new client device may be assigned a remote data storage device. If the above-described processing proceeds without error at Blocks 713 and 715, then a portal login is created at Block 717, and a welcome to service page along with instructions may be sent at Block 719, as also illustrated at FIGS. 7P and 7Q.

Still referring to FIG. 6B, the host is also initialized, as shown at Blocks 730-736 by creating groups, data sets, schedules, retention policies, users, etc. The initialization backup is then started at Block 737.

Referring now to FIG. 6C, client device initialization is then performed by attempting to perform complete initialization backup at Block 740, loading the initialization activity at Block 742 and performing manual intervention if the initialization does not succeed at Blocks 744 and 754-758. If the initialization does succeed at Block 744, then client confirmation takes place at FIG. 6D by notifying the appropriate functions of the confirmation at Blocks 745, 746, 747, 748 and 749, and sending the appropriate confirmations at Blocks 751, 752 and 753. A user interface for Block 753 is illustrated at FIG. 7R.

Embodiments of the present invention can simplify a data storage service and/or other client/server application installation process, decrease the time required for installation from hours to seconds, and/or significantly reduce client time and involvement in the process. Moreover, streamlined provisioning can reduce or eliminate human error and can allow greater scalability by allowing the addition of many computers to data storage services and/or other client/server applications in parallel.

Moreover, some embodiments of the present invention can allow a third party application, such as remote backup, to be easily installed in both an end user and a remote data storage system perspective. Previous capabilities may have required about thirty to forty minutes of time by the user, and about two to three hours from the remote data storage system to start the backup service. In sharp contrast, some embodiments of the present invention can collapse the prior operations down to seconds, and can reduce or minimize end user involvement, while reducing or eliminating system personnel involvement from back end processing.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of performing remote data storage for a plurality of client devices that are associated with an enterprise comprising:
    obtaining authorization at a remote data storage system from an administrator of the enterprise to subscribe the plurality of client devices to the remote data storage system;
    in response to obtaining the administrator authorization, downloading remote data storage software for the remote data storage system to the plurality of client devices;
    in response to authorization from a given client device, performing the following automatically at the given client device: installing the remote data storage software, obtaining metadata about the given client device, uploading the metadata to the remote data storage system and initiating an initial remote data storage to the remote data storage system using the metadata that was obtained; and
    performing the following at the remote data storage system:
        assigning the enterprise to a plurality of remote data storage devices in the remote data storage system in response to obtaining authorization from the administrator of the enterprise to subscribe the plurality of client devices to the remote data storage system;
        executing a load-balancing program to programmatically assign the given client device to a subset of the remote data storage devices, in response to obtaining the metadata about the given client device; and
        wherein initiating an initial remote data storage to the remote data storage system using the metadata that was obtained comprises initiating an initial remote data storage to the subset of the remote data storage devices in the remote data storage system,
    wherein executing a load-balancing program to programmatically assign the given client device to a subset of the remote data storage devices comprises:
        identifying the plurality of remote data storage devices that are assigned to the enterprise;
        identifying from the plurality of remote data storage devices that are assigned to the enterprise, candidate remote data storage devices for remote data storage for the given client device;
        assigning the given client device to at least one remote data storage device from the candidate remote data storage devices, that is storing data for a fewest number of client devices, if the fewest number of client devices is less than a predetermined number; and
        assigning the given client device to at least one remote data storage device from the candidate remote data storage devices, that is storing data for a fewest number of client devices and that also has a lowest ratio of assigned client devices to actual client devices, if the fewest number of client devices is more than the predetermined number.

2. A method according to claim 1 wherein the metadata about the given client device comprises an address of the given client device and a data storage quantity for the given client device.

3. A remote data storage system that is configured to perform the method of claim 1.

4. A computer program product, the computer program product on a computer device and having computer-readable program code embodied in a tangible computer readable medium, the computer-readable program code when executed by the computer device causes the computer device to perform the method of claim 1.

5. A method of performing remote data storage for a plurality of client devices that are associated with an enterprise comprising:
    assigning the enterprise to a subset of remote data storage devices in a remote data storage system; and
    executing a load-balancing program to programmatically assign a given client device that is associated with the enterprise to at least one of the remote data storage devices in the subset,
    wherein the load-balancing program uses a predetermined number to assign the given client device to the at least one of the remote data storage devices in the subset; and
    wherein the load balancing program assigns the given client device to the at least one of remote data storage devices in the subset, that is storing data for a fewest number of client devices and that also has a lowest ratio of assigned client devices to actual client devices, if the fewest number of client devices is more than the predetermined number.

6. A method according to claim 5 wherein the executing the load-balancing program to programmatically assign the given client device that is associated with the enterprise to the at least one of the remote data storage devices in the subset comprises:
   identifying from the subset of remote data storage devices that are assigned to the enterprise, candidate remote data storage devices for remote data storage for the given client device; and
   assigning the given client device to at least one remote data storage device from the candidate remote data storage devices, that is storing data for the fewest number of client devices, if the fewest number of client devices is less than the predetermined number.

7. A remote data storage system that is configured to perform the method of claim 5.

8. A computer program product, the computer program product on a computer device and having computer-readable program code embodied in a tangible computer readable medium, the computer-readable program code when executed by the computer device causes the computer device to perform the method of claim 5.

9. A method of performing remote data storage for a plurality of client devices that are associated with an enterprise comprising:
   assigning the enterprise to a subset of remote data storage devices in a remote data storage system; and
   executing a load-balancing program to programmatically assign a given client device that is associated with the enterprise to at least one of the remote data storage devices in the subset, wherein executing a load-balancing program to programmatically assign a given client device that is associated with the enterprise to at least one of the remote data storage devices in the subset comprises:
      identifying from the subset of remote data storage devices that are assigned to the enterprise, candidate remote data storage devices for remote data storage for the given client device;
      assigning the given client device to at least one remote data storage device from the candidate remote data storage devices, that is storing data for a fewest number of client devices, if the fewest number of client devices is less than a predetermined number; and
      assigning the given client device to at least one remote data storage device from the candidate remote data storage devices, that is storing data for a fewest number of client devices and that also has a lowest ratio of assigned client devices to actual client devices, if the fewest number of client devices is more than the predetermined number.

10. A method of performing remote data storage for a plurality of client devices comprising:
    in response to authorization from a given client device, performing the following automatically at the given client device: obtaining metadata about the given client device; uploading the metadata to a remote data storage system and initiating an initial remote data storage to the remote data storage system using the metadata that was obtained; and
    executing a load-balancing program to programmatically assign the given client device to at least one remote data storage device in a subset of remote data storage devices from the data storage system, wherein executing the load-balancing program comprises:
       assigning the given client device to the at least one remote data storage device that is storing data for a fewest number of client devices, if the fewest number of client devices is less than a predetermined number; and
       assigning the given client device to the at least one remote data storage device that also has a lowest ratio of assigned client devices to actual client devices, if the fewest number of client devices is more than the predetermined number.

11. A method according to claim 10 wherein the plurality of client devices are associated with an enterprise, the method further comprising the following that are performed by the remote data storage system:
    assigning the enterprise to a plurality of remote data storage devices in the remote data storage system;
    executing the load-balancing program to programmatically assign the given client device to the subset of the plurality of remote data storage devices, in response to obtaining the metadata about the given client device; and
    wherein the initiating the initial remote data storage to the remote data storage system using the metadata that was obtained comprises initiating the initial remote data storage to the subset of the plurality of remote data storage devices in the remote data storage system.

12. A method according to claim 11 wherein the executing the load-balancing program further comprises:
    identifying the plurality of remote data storage devices that are assigned to the enterprise;
    identifying from the plurality of remote data storage devices that are assigned to the enterprise, candidate remote data storage devices for remote data storage for the given client device; and
    assigning the given client device to at least one remote data storage device from the candidate remote data storage devices.

13. A method according to claim 12 further comprising:
    assigning the given client device to at least one remote data storage device from the candidate remote data storage devices, that is storing data for the fewest number of client devices and that also has the lowest ratio of assigned client devices to actual client devices, if the fewest number of client devices is more than the predetermined number.

14. A method according to claim 10 wherein the metadata about the given client device comprises an address of the given client device and a data storage quantity for the given client device.

15. A remote data storage system that is configured to perform the method of claim 10.

16. A computer program product, the computer program product on a computer device and having computer-readable program code embodied in a tangible computer readable medium, the computer-readable program code when executed by the computer device causes the computer device to perform the method of claim 10.

17. A method of performing remote data storage for a client device comprising:
    obtaining authorization at a remote data storage system to subscribe the client device to the remote data storage system;
    in response to obtaining the authorization, downloading remote data storage software for the remote data storage system to the client device;

in response to authorization from the client device, performing the following automatically at the client device: installing the remote data storage software, obtaining metadata about the client device, uploading the metadata to the remote data storage system and initiating an initial remote data storage to the remote data storage system using the metadata that was obtained; and executing a load-balancing program at the remote data storage system to programmatically assign the given client device to a subset of remote data storage devices in the remote data storage system, in response to obtaining the metadata about the given client device, wherein executing the load-balancing program to programmatically assign the given client device to the subset of the remote data storage devices comprises:

identifying a plurality of remote data storage devices;

identifying from the plurality of remote data storage devices, candidate remote data storage devices for remote data storage for the given client device;

assigning the given client device to at least one remote data storage device from the candidate remote data storage devices, that is storing data for a fewest number of client devices, if the fewest number of client devices is less than a predetermined number; and assigning the given client device to at least one remote data storage device from the candidate remote data storage devices, that is storing data for a fewest number of client devices and that also has a lowest ratio of assigned client devices to actual client devices, if the fewest number of client devices is more than the predetermined number.

18. A method according to claim 17 wherein the initiating the initial remote data storage to the remote data storage system using the metadata that was obtained comprises initiating the initial remote data storage to the subset of the remote data storage devices in the remote data storage system.

19. A method according to claim 17 wherein the metadata about the client device comprises an address of the client device and a data storage quantity for the client device.

20. A remote data storage system that is configured to perform the method of claim 17.

21. A computer program product, the computer program product on a computer device and having computer-readable program code embodied in a tangible computer readable medium, the computer-readable program code when executed by the computer device causes the computer device to perform the method of claim 17.

22. A method of performing remote data storage for a client device comprising:

assigning an enterprise to a subset of remote data storage devices in a remote data storage system;

in response to authorization from the client device, performing the following automatically at the client device: obtaining metadata about the client device; uploading the metadata to the remote data storage system and initiating an initial remote data storage to the subset of remote data storage devices in the remote data storage system using the metadata that was obtained; and executing a load-balancing program to programmatically assign the client device to at least one of the remote data storage devices in the subset, wherein executing the load-balancing program comprises assigning the client device to at least one remote data storage device from candidate remote data storage devices of the subset, that is storing data for a fewest number of client devices and that also has a lowest ratio of assigned client devices to actual client devices, if the fewest number of client devices is more than a predetermined number.

23. A remote data storage system that is configured to perform the method of claim 22.

24. A computer program product, the computer program product on a computer device and having computer-readable program code embodied in a tangible computer readable medium, the computer-readable program code when executed by the computer device causes the computer device to perform the method of claim 22.

* * * * *